US012795505B2

(12) United States Patent
Lu et al.

(10) Patent No.: US 12,795,505 B2
(45) Date of Patent: Nov. 10, 2026

(54) METHOD AND APPARATUS FOR TRANSMITTING AND RECEIVING SIGNAL AND COMMUNICATION SYSTEM

(71) Applicant: 1FINITY Inc., Kawasaki (JP)

(72) Inventors: Yang Lu, Beijing (CN); Su Yi, Beijing (CN); Guorong Li, Beijing (CN); Meiyi Jia, Beijing (CN)

(73) Assignee: 1FINITY Inc., Kawasaki (JP)

( * ) Notice: Subject to any disclaimer, the term of this patent is extended or adjusted under 35 U.S.C. 154(b) by 440 days.

(21) Appl. No.: 18/372,186

(22) Filed: Sep. 25, 2023

(65) Prior Publication Data

US 2024/0015634 A1 Jan. 11, 2024

Related U.S. Application Data

(63) Continuation of application No. PCT/CN2021/084793, filed on Mar. 31, 2021.

(51) Int. Cl.
*H04W 40/36* (2009.01)
*H04W 36/00* (2009.01)
(Continued)

(52) U.S. Cl.
CPC ....... *H04W 40/36* (2013.01); *H04W 36/0079* (2018.08); *H04W 36/008357* (2023.05);
(Continued)

(58) Field of Classification Search
CPC ............. H04W 40/36; H04W 36/0079; H04W 36/008357; H04W 36/087; H04W 36/142;
(Continued)

(56) References Cited

U.S. PATENT DOCUMENTS

2020/0092939 A1 3/2020 Kim et al.
2022/0141749 A1 * 5/2022 Luo .................... H04W 36/305 370/331

(Continued)

FOREIGN PATENT DOCUMENTS

CN 110536350 A 12/2019
CN 110719614 A 1/2020

(Continued)

OTHER PUBLICATIONS

International Search Report and Written Opinion of the International Searching Authority issued by the China National Intellectual Property Administration for corresponding International Patent Application No. PCT/CN2021/084793, mailed on Dec. 30, 2021 with an English translation.

(Continued)

*Primary Examiner* — Kibrom T Hailu
(74) *Attorney, Agent, or Firm* — Myers Wolin, LLC

(57) ABSTRACT

An apparatus for transmitting and receiving signals, the apparatus being applicable to a process of migrating an IAB-node under control of a first donor central unit (donor-CU) from a first distribution unit (DU) to a second DU, and being arranged in the first donor-CU, wherein the apparatus includes a memory, and a processor coupled to the memory and configured to transmit one or more first path migration configurations for an integrated access and backhaul node (IAB-node), and transmit one or more second path migration configurations for a child node, wherein the first path migration configurations correspond to a parent node to which a first candidate cell of the IAB-node belongs, and the second path migration configurations correspond to a parent node to which the second candidate cell of the IAB-node belongs.

19 Claims, 12 Drawing Sheets

(51) Int. Cl.
*H04W 36/08* (2009.01)
*H04W 36/14* (2009.01)
*H04W 88/08* (2009.01)

(52) U.S. Cl.
CPC ....... *H04W 36/087* (2023.05); *H04W 36/142* (2023.05); *H04W 88/085* (2013.01)

(58) Field of Classification Search
CPC .......... H04W 88/085; H04W 36/0055; H04W 40/22
See application file for complete search history.

(56) References Cited

U.S. PATENT DOCUMENTS

| | | | | |
|---|---|---|---|---|
| 2022/0303836 | A1* | 9/2022 | Wang | H04W 36/087 |
| 2022/0322464 | A1* | 10/2022 | Luo | H04W 36/0064 |
| 2023/0292191 | A1* | 9/2023 | Xu | H04W 36/08 |
| 2024/0064601 | A1* | 2/2024 | Chen | H04W 36/362 |
| 2024/0314546 | A1* | 9/2024 | Xu | H04W 8/26 |

FOREIGN PATENT DOCUMENTS

| | | | |
|---|---|---|---|
| CN | 111093286 | A | 5/2020 |
| WO | 2020090987 | A1 | 5/2020 |
| WO | 2020222308 | A1 | 11/2020 |
| WO | 2020222309 | A1 | 11/2020 |
| WO | 2021/027501 | A1 | 2/2021 |

OTHER PUBLICATIONS

Fujitsu, "Discussion on inter-donor IAB migration", Agenda Item: 13.2.1, 3GPP TSG-RAN WG3 Meeting #110-e, R3-206107, Online, Nov. 2-12, 2020.

ZTE et al., "Discussion on inter-Donor IAB Node Migration procedure", Agenda Item: 13.2.1, 3GPP TSG-RAN WG3 Meeting #110-e, R3-206559, Online, Nov. 2-12, 2020.

The Extended European search report with the Supplementary European search report and the European search opinion, issued by the European Patent Office for corresponding European Patent Application No. 21933912.4, mailed on Mar. 26, 2024.

Notice of Reasons for Refusal issued by the Japan Patent Office for corresponding Japanese Patent Application No. 2023-559857, mailed on Sep. 3, 2024, with an English translation.

ZTE et al., "Further considerations on inter-donor IAB Node Migration procedure", Agenda Item: 13.2.1.1, 3GPP TSG RAN WG3 #111-e, R3-210207, Jan. 25-Feb. 4, 2021.

CATT, "CHO and DAPS for IAB", Agenda item: 13.2.1.2; 3GPP TSG-RAN3 Meeting #111-e, R3-210101, E-meeting, Jan. 25-Feb. 4, 2021.

Fujitsu, "Handling of descendant nodes and UEs in inter-CU CHO and RLF recovery", Agenda item: 8.4.3; 3GPP TSG-RAN WG2 Meeting #113 electronic, R2-2100754, Online, Jan. 25th-Feb. 5, 2021.

Huawei, "CHO and DAPS in R17 IAB", Agenda Item: 13.2.1; 3GPP TSG-RAN WG3 meeting #110-e, R3-206666, E-meeting, Nov. 2-12, 2020.

ZTE, "Sanechips, Discussion on supporting R16 CHO and DAPS in IAB", Agenda Item: 13.2.1; 3GPP TSG-RAN WG3 #110-e, R3-206560, Nov. 2-12, 2020.

Fujitsu, "CHO for UE or IAB-MT on migration", Agenda item: 8.4.3; 3GPP TSG-RAN WG2 Meeting #112 electronic, R2-2009007, Online, Nov. 2-13, 2020.

CATT, "Summary of offline discussion on CHO and DAPS", Agenda item: 13.2.1.2; 3GPP TSG-RAN WG3 #111-e, R3-211002, E-meeting, Jan. 25-Feb. 4, 2021.

First Notification of Office Action and Search Report issued by the China National Intellectual Property Administration for corresponding Chinese Patent Application No. 202180096702.2, mailed on Apr. 27, 2026, with an English translation.

* cited by examiner

METHOD AND APPARATUS FOR TRANSMITTING AND RECEIVING SIGNAL AND COMMUNICATION SYSTEM

CROSS-REFERENCE TO RELATED APPLICATION

This application is a continuation application of International Application PCT/CN2021/084793 filed on Mar. 31, 2021, and designated the U.S., the entire contents of which are incorporated herein by reference.

TECHNICAL FIELD

This disclosure relates to the field of communication technologies.

BACKGROUND

Integrated access and backhaul (IAB) enables a function of radio relay in a next generation radio access network (NG-RAN). An integrated access and backhaul node (IAB-node) supports access and backhaul via New Radio (NR). A termination point of NR backhaul at a network side is referred to as an IAB-donor, which denotes a network device (e.g. a gNB) supporting an IAB function.

An IAB-node is connected to an IAB-donor via one or more hops. These multi-hop connections form a directed acyclic graph (DAG) topology with the IAB-donor as a root node. The IAB-donor is responsible for executing centralized resource management, topology management and routing management in an IAB network topology.

The IAB-node supports a function of a gNB-DU (distributed unit), and an IAB-node DU is also referred to as an IAB-DU, which is an end point of a New Radio access (NR access) interface to a terminal equipment (UE) and a next hop of IAB-node, and is also an end point of an F1 protocol to a gNB-CU (central unit) on the IAB-node. The IAB-DU may serve for a common UE and an IAB child node. The IAB-DU enables functions of a network side device, is connected to a downstream child IAB-node, provides NR air-interface access for UEs and downstream IAB child nodes, and establishes F1 connection to an IAB donor-CU.

In addition to the function of the gNB-DU, the IAB-node also supports some functions of the UE, referred to as an IAB-MT (mobile termination). The IAB-MT includes, for example, a physical layer, layer 2, RRC and NAS functions to be connected to a gNB-DU on another IAB-node or IAB-donor, a gNB-CU on the IAB-donor and a core network. The IAB-MT may support such functions as a UE physical layer, an access stratum (AS), a radio resource control (RRC) layer and a non-access stratum (NAS), and may be connected to an IAB parent node.

FIG. 1 is a schematic diagram of the IAB topology. As shown in FIG. 1, in an IAB topology 10, an IAB-node 100 includes an IAB-MT functional unit 101 and an IAB-DU functional unit 102, neighboring nodes connected to an interface of the IAB-DU functional unit 102 are referred to as child nodes, such as child nodes 201, 202 and 203 shown in FIG. 1, the IAB-DU functional unit 102 may be in communication with the child nodes 201, 202 and 203 via an air interface (Uu), neighboring nodes connected to an interface of the IAB-MT functional unit 101 are referred to as parent nodes, such as parent nodes 301 and 302 shown in FIG. 1, and the IAB-MT functional unit 101 may be in communication with the parent nodes 301 and 302 via an air interface (Uu).

As shown in FIG. 1, a direction from IAB-node 100 to child nodes 201, 202 and 203 is referred to as a downstream direction, and a direction from IAB-node 100 to parent nodes 301 and 302 is referred to as an upstream direction. And an IAB-donor (not shown) executes centralized resource management, topology management and routing management for the IAB topology 10.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY OF THE DISCLOSURE

In order to reduce a service interruption time in a process of path migration of an IAB-node, the IAB-node and its child node may be made to simultaneously perform F1 path migration: transmitting an RRC reconfiguration message used to migrate an F1 transmission path to the child node of the IAB-node via an original path, that is, transmitting the RRC reconfiguration message to the child node before the IAB-node completes handover. After successful access of the IAB-node to a parent node at a target side, the F1 transmission path is migrated. There are two specific methods for enabling a downstream child node to migrate the F1 transmission path: transmitting an F1 migration indication message to the downstream child node after successful access of the IAB-node to the parent node at the target side, and performing F1 transmission path migration by the child node after receiving the indication; or, not directly transmitting the RRC reconfiguration message of the child node to the child node, but first buffering the RRC reconfiguration message in the IAB-node, and then transmitting the RRC reconfiguration message of the child node to the child node after successful access of the IAB-node to the parent node at the target side, to make the child node perform migration of the F1 transmission path.

However, is was found by the inventors of this disclosure that following defects exist in the above methods for performing migration of the F1 transmission path by the downstream child node:

1. when the IAB node moves between different donor-CUs, both the IAB node and the child node are unable to simultaneously update a network topology;
2. when the IAB node moves within the same donor-CU or between different donor-CUs, in a case where handover of the IAB-node fails, the child node is unable to perform correct path migration, thereby increasing service interruption times in the path migration process; and
3. if the IAB-node is configured with conditional handover (CHO), there exist target paths for multiple candidate cells, and after the IAB-node performs handover, the child node is unable to perform migration of the F1 transmission path simultaneously with the IAB-node.

Addressed to at least one of the above defects, embodiments of this disclosure provide a method and apparatus for transmitting and receiving a signal and a communication system, wherein in a case where an IAB-node is migrated from a first DU to a second DU, a first donor-DU may transmit first path migration configuration for the IAB-node and second path migration configuration for a child node respectively to the IAB-node and the child node of the IAB-node, thereby facilitating the IAB-node and the child node to simultaneously perform migration of transmission paths when the IAB-node moves within a donor-DU or between donor-DUs.

According to an aspect of the embodiments of this disclosure, there is provided an apparatus for transmitting and receiving a signal, the apparatus being applicable to a process of migrating an IAB-node under control of a first donor central unit (donor-CU) from a first distribution unit (DU) to a second DU, and being arranged in the first donor-CU, wherein the apparatus includes a first processing unit, the first processing unit being configured to perform control to enable that:

one or more first path migration configurations for an integrated access and backhaul node (IAB-node) are transmitted to the IAB-node; and one or more second path migration configurations for a child node of the IAB-node are transmitted to the child node, wherein the first path migration configurations correspond to a first candidate cell of the IAB-node or a DU to which the first candidate cell of the IAB-node belongs, and the second path migration configurations correspond to a second candidate cell of the IAB-node or a DU to which the second candidate cell of the IAB-node belongs.

According to another aspect of the embodiments of this disclosure, there is provided an apparatus for transmitting and receiving a signal, the apparatus being applicable to a process of migrating an IAB-node under control of a first donor central unit (donor-CU) from a first distribution unit (DU) to a second DU, and being arranged in a second donor-CU, wherein the apparatus includes a second processing unit, the second processing unit being configured to perform control to enable that:

the second donor-CU receives one or more first path migration requests for an integrated access and backhaul node (IAB-node) from the first donor-CU;

the second donor-CU transmits one or more first path migration configurations for the IAB-node to the first donor-CU;

the second donor-CU receives one or more second path migration requests for the child node of the IAB-node from the first donor-CU; and the second donor-CU transmits one or more second path migration configurations for the child node of the IAB-node to the first donor-CU;

wherein the first path migration requests correspond to a first candidate cell of the IAB-node, and the second path migration requests correspond to a second candidate cell of the IAB-node, the first path migration configurations correspond to a first candidate cell of the IAB-node or a DU to which the first candidate cell belongs, and the second path migration configurations correspond to a second candidate cell of the IAB-node or a DU to which the second candidate cell belongs.

According to a further aspect of the embodiments of this disclosure, there is provided an apparatus for transmitting and receiving a signal, the apparatus being applicable to a process of migrating an IAB-node from a first distribution unit (DU) of a first donor-CU to a second DU, and being arranged in the IAB-node, wherein the apparatus includes a third processing unit, the third processing unit being configured to perform control to enable that:

the IAB-node receives one or more first path migration configurations for the IAB-node transmitted by the first donor-CU, wherein the first path migration configurations correspond to a first candidate cell of the IAB-node or a DU to which the first candidate cell of the IAB-node belongs;

when an execution condition of the first path migration configurations is satisfied, the IAB-node executes the first path migration configurations and initiates random access to the first candidate cell to which the first path migration configurations correspond; and when the random access is successful, the IAB-node transmits a first migration success indication to a child node.

According to still another aspect of the embodiments of this disclosure, there is provided an apparatus for transmitting and receiving a signal, the apparatus being applicable to a process of migrating an IAB-node under control of a first donor central unit (donor-CU) from a first distribution unit (DU) to a second DU, and being arranged in a child node of the IAB-node, wherein the apparatus includes a fourth processing unit, the fourth processing unit being configured to perform control to enable that:

the child node of the IAB-node receives one or more second path migration configurations for the child node transmitted by the first donor-CU, wherein the second path migration configurations correspond to a second candidate cell of the IAB-node or a DU to which a second candidate cell of the IAB-node belongs;

the child node receives a first migration success indication transmitted by the IAB-node when random access initiated by the IAB-node to the first candidate cell is successful; and the child node executes second path migration configurations to which the second candidate cell or the DU to which the second candidate cell belongs corresponds.

According to yet another aspect of the embodiments of this disclosure, there is provided a method for transmitting and receiving a signal, corresponding to the apparatus for transmitting and receiving a signal in any one of the above aspects.

An advantage of the embodiments of this disclosure exists in that a first donor-DU may transmit first path migration configuration for the IAB-node and second path migration configuration for a child node respectively to the IAB-node and the child node of the IAB-node, thereby facilitating the IAB-node and the child node to simultaneously perform migration of transmission paths when the IAB-node moves within a donor-DU or between donor-DUs.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

DETAILED DESCRIPTION OF THE DISCLOSURE

Figure 1:
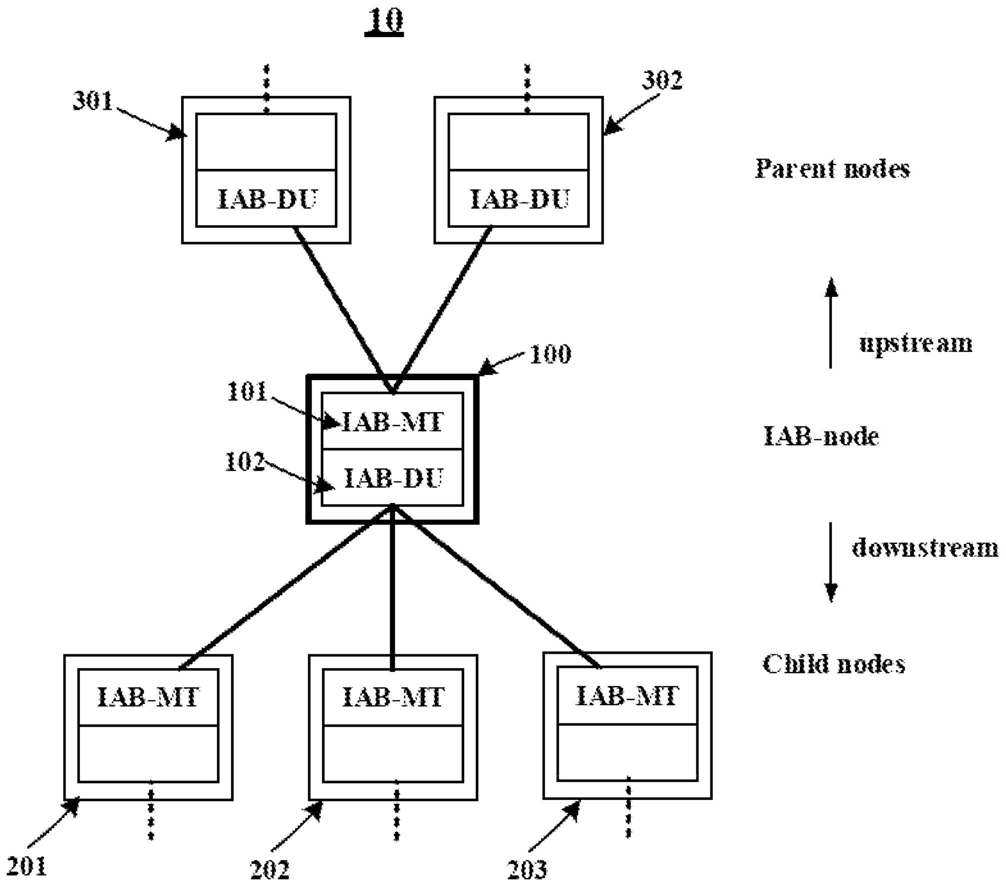
FIG. 1 is a schematic diagram of an IAB topology.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and New Radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following devices: integrated access and backhaul node (IAB-node), a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" or "terminal equipment (TE) or terminal device" refers to, for example, an equipment accessing to a communication network and receiving network services via a network device. The terminal equipment may be fixed or mobile, and may also be referred to as a mobile station (MS), a terminal, a subscriber station (SS), an access terminal (AT), and a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station or one or more network devices including those described above. The term "user side" or "terminal side" or "terminal equipment side" refers to a side of a user or a terminal, which may be a UE, and may include one or more terminal equipments described above.

In the embodiments of this disclosure, higher-layer signaling may be, for example, radio resource control (RRC) signaling; for example, it is referred to an RRC message, which includes MIB, system information, and a dedicated RRC message; or, it is referred to an as RRC IE (RRC information element). Higher-layer signaling may also be, for example, F1-C signaling, or an F1AP protocol; however, this disclosure is not limited thereto.

During movement of an IAB-node, if it is disconnected from an original parent IAB-node and is connected to a new parent IAB-node, a change of routing from the IAB-node and its child nodes to a donor-CU, i.e. a change of network topology, is resulted, such as a change of network topology resulted when the IAB-node is handed over to a new parent node or establishes dual-connection with a new parent node.

Figure 2:
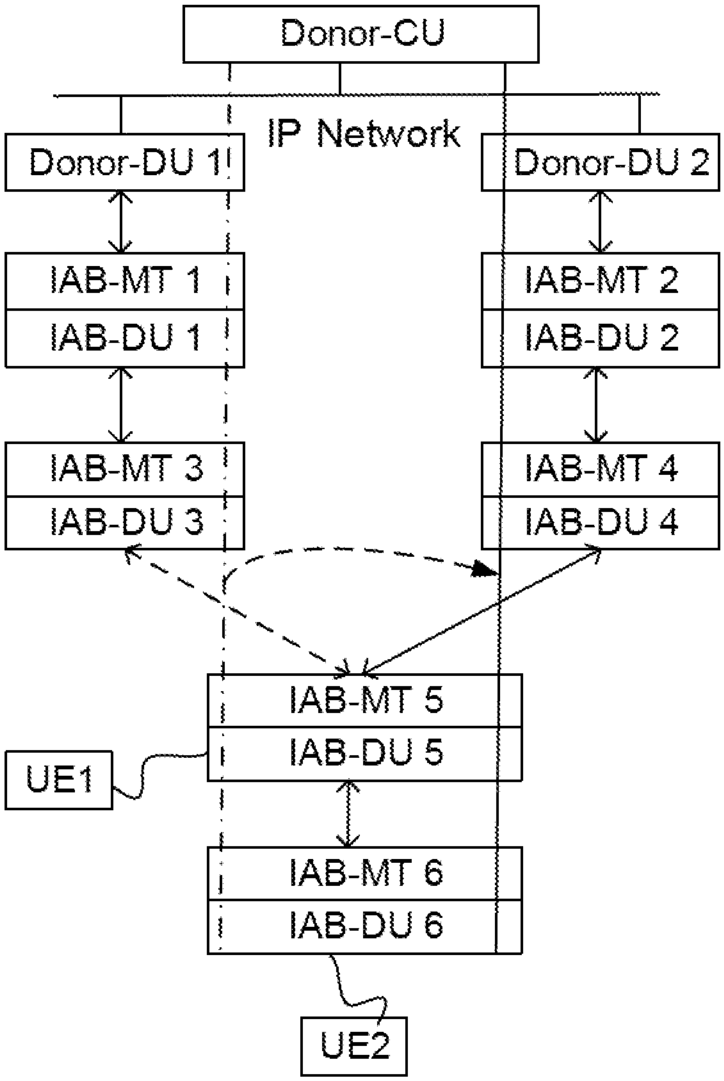
FIG. 2 is a schematic diagram of a change of a network topology resulted from movement of an IAB-node.

FIG. 2 is a schematic diagram of a change of a network topology resulted from movement of an IAB-node. As shown in FIG. 2, after IAB-node 5 is handed over from a cell under IAB-node 3 to a cell under IAB-node 4, routes from IAB-node 5 and its downstream child node IAB-node6 to a donor-CU are all changed.

For a process of update of the network topology when the IAB-node moves in a DU under the same donor-CU, when the IAB-node is handed over, the donor-CU configures the IAB-node with a default backhaul RLC channel (default BH RLC channel) used for a target path of uplink F1-C and non-F1 data and a default BAP routing identity (default BAP routing ID) via an RRC reconfiguration message. If the donor-DU is changed after handover, the donor-DU may possibly configure the IAB-node with an IP address that can be routed to the target donor-DU, wherein the default routing ID contains the BAP address and path ID of the target donor-DU. After the IAB-node is handed over to a new parent node, the IAB-node starts to apply the above configuration, that is, migrating F1-C and non-F1 transmission paths to the target side.

EMBODIMENT OF A FIRST ASPECT

The embodiment of the first aspect of this disclosure provides a method for transmitting and receiving a signal, applicable to a process of migrating an IAB-node under control of a first donor central unit (donor-CU) from a first distribution unit (DU) to a second DU. The method for transmitting and receiving a signal shall be described at a side of the first donor-CU in the embodiment of the first aspect of this disclosure.

Figure 3:
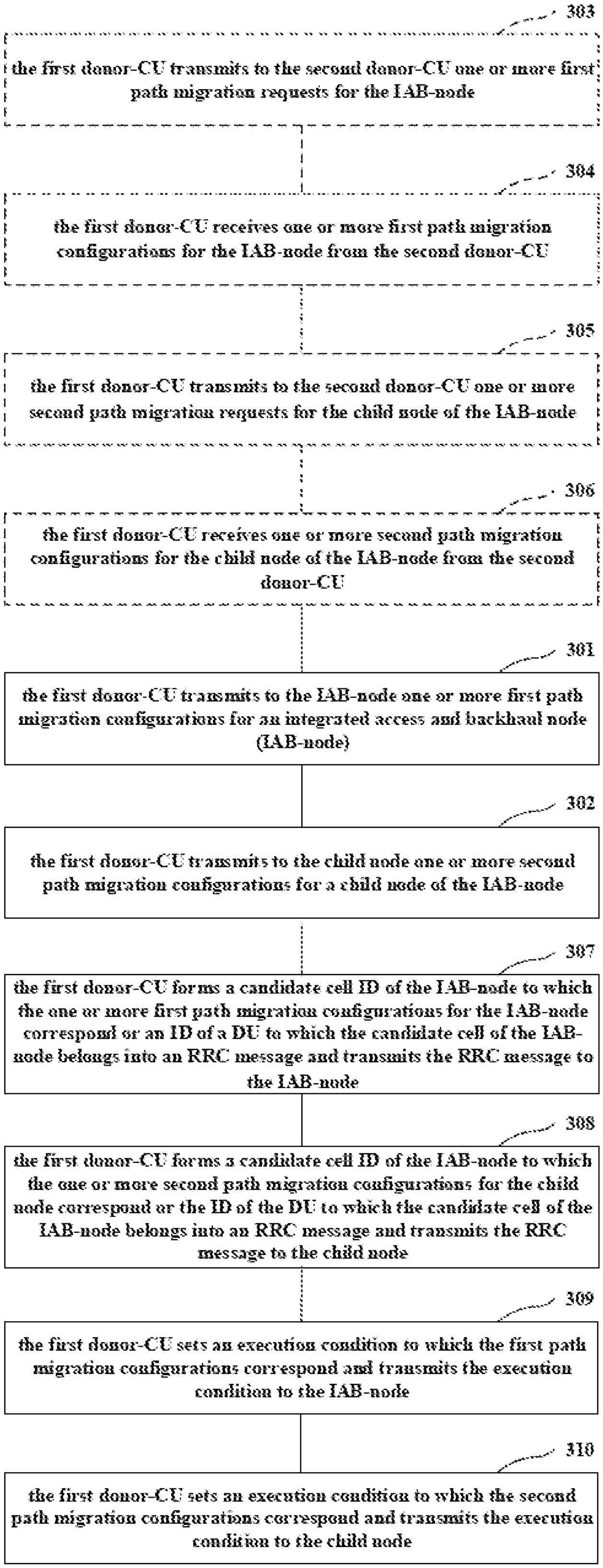
FIG. 3 is a schematic diagram of the method for transmitting and receiving a signal of an embodiment of a first aspect of this disclosure.

FIG. 3 is a schematic diagram of the method for transmitting and receiving a signal of the embodiment of the first aspect of this disclosure. As shown in FIG. 3, the method includes:

operation 301: the first donor-CU transmits to the IAB-node one or more first path migration configurations for an integrated access and backhaul node (IAB-node); and operation 302: the first donor-CU transmits to the child node one or more second path migration configurations for a child node of the IAB-node.

In this disclosure, the first path migration configurations correspond to a first candidate cell of the IAB-node or a DU to which the first candidate cell of the IAB-node belongs, and the second path migration configurations correspond to a second candidate cell of the IAB-node or a DU to which the second candidate cell of the IAB-node belongs. The first candidate cell and the second candidate cell may be different, hence, this method may support a scenario where a candidate cell of a migration path of the IAB-node and a candidate cell of a migration path of the child node are different, thereby achieving more flexible path migration configurations. And furthermore, the first candidate cell and the second candidate cell may also be identical.

According to the embodiment of the first aspect of this disclosure, the first donor-DU may transmit first path migration configuration and second path migration configuration respectively to the IAB-node and the child node of the IAB-node, thereby facilitating the IAB-node and the child node to simultaneously perform migration of transmission paths, and updating the network topology.

In this disclosure, both the first DU and the second DU may belong to the first donor-CU. Therefore, the IAB-node may be migrated within the first donor-CU, in which case the first path migration configuration and the second path migration configuration may be generated in the first donor-CU. In addition, the first DU and the second DU may belong to different donor-CUs, that is, the first DU belongs to the first donor-CU, and the second DU belongs to the second donor-CU. Therefore, the IAB-node may be migrated between the first donor-CU and the second donor-CU, in which case the first path migration configuration and the second path migration configuration may be obtained by the first donor-CU from the second donor-CU.

In the description of this disclosure, the first donor-CU is sometimes referred to as an original donor-CU (source donor-CU, and the second donor-CU is sometimes referred to as a target donor-CU.

In operation 302, the first donor-CU transmits the second path migration configuration to the child node before the IAB-node performs path migration, that is, the first donor-CU transmits the second path migration configuration via the original path, allowing the IAB-node and the child node to hand over paths simultaneously.

As shown in FIG. 3, in the case where the second DU belongs to the second donor-CU, the method may further include:

operation 303: the first donor-CU transmits to the second donor-CU one or more first path migration requests for the IAB-node;

operation 304: the first donor-CU receives one or more first path migration configurations for the IAB-node from the second donor-CU;

operation 305: the first donor-CU transmits to the second donor-CU one or more second path migration requests for the child node of the IAB-node; and operation 306: the first donor-CU receives one or more second path migration configurations for the child node of the IAB-node from the second donor-CU.

In operation 303 and operation 305, the first path migration requests correspond to the first candidate cell of the IAB-node, and the second path migration requests correspond to the second candidate cell of the IAB-node. For example, the first path migration requests at least include a cell identity of the first candidate cell of the IAB-node, and the second path migration requests at least include a cell identity of the second candidate cell of the IAB-node.

The first path migration configuration and the second path migration configuration are respective path configurations of the IAB-node and child node in the new network topology, which respectively include at least one of the following parameters:

an IP address routable to the DU to which the first candidate cell belongs, a routing ID, a radio link control (RLC) channel ID, or a new backhaul adaptation protocol (BAP) address.

In operation 303, the first donor-CU transmits the first path migration requests for the IAB-node via a handover request message or a secondary node addition request message, and in operation 304, the first donor-CU receives the first path migration configurations for the IAB-node via a handover request acknowledge message or a secondary node addition request acknowledge message. The secondary node addition request acknowledge message is used for the IAB-node to establish dual-connection with the second DU. As the topology change is caused by the movement of the IAB-node, the path migration of the IAB-node is necessarily accompanied by the handover of the IAB-node or establishment of the dual-connection, and the path migration requests for the IAB-node may be included in the handover request message or secondary node addition request message for the IAB-node.

In operation 305, the first donor-CU transmits the second path migration requests for the child node via a handover request message or a secondary node addition request message, or transmits the second path migration requests for the child node via a path migration request message. As the topology change is caused by the movement of the IAB-node and a topological relationship between the child node and the IAB-node is not changed, the child node needs not to be handed over or establish dual-connection, and needs only to migrate the path. The path migration request for the child node may not be contained in the handover request message or secondary node addition request message for the IAB-node.

In operation 306, the first donor-CU receives the second path migration configurations for the child node of the IAB-node via a handover request acknowledge message or a secondary node addition request acknowledge message, or receives the second path migration configurations for the child node via a path migration request acknowledge message.

Therefore, the first donor-CU may simultaneously request path migration for both the IAB node and the child node, or may separately request path migration for the child node.

As shown in FIG. 3, the method further includes:

operation 307: the first donor-CU forms a candidate cell ID of the IAB-node to which the one or more first path migration configurations for the IAB-node correspond or an ID of a DU to which the candidate cell of the IAB-node belongs into an RRC message and transmits the RRC message to the IAB-node; and operation 308: the first donor-CU forms a candidate cell ID of the IAB-node to which the one or more second path migration configurations for the child node correspond or the ID of the DU to which the candidate cell of the IAB-node belongs into an RRC message and transmits the RRC message to the child node. For example, the candidate ID cell may be a physical cell identity (PCI) or a global cell identity (PCI) of the candidate cell, and the ID of the DU may be a BAP address of the DU.

As shown in FIG. 3, the method further includes:

operation 309: the first donor-CU sets an execution condition to which the first path migration configurations correspond and transmits the execution condition to the IAB-node.

For example, the execution condition of the second path migration configurations set by the first donor-CU is that a signal of the first candidate cell satisfies requirement of A3 or A5 event. Hence, the IAB-node may achieve condition-based path migration, that is, the first path migration configuration is executed when the execution condition set by the first donor-CU is satisfied.

As shown in FIG. 3, the method further includes:

operation 310: the first donor-CU sets an execution condition to which the second path migration configurations correspond and transmits the execution condition to the child node.

For example, the execution condition to which the second path migration configurations correspond set by the first donor-CU is that the child node receives a migration success indication from the IAB-node, or receives a reestablishment success indication from the IAB-node. Therefore, when the child node satisfies the execution condition set by the first donor-CU, it may perform the second path migration configuration, so that the child node may perform path migration simultaneously with the IAB node, thereby reducing service interruption times in the path migration process.

According to the embodiment of the first aspect of this disclosure, the first donor-DU may request the second donor-DU for path migration configuration, and transmits the first path migration configuration for the IAB-node and the second path migration configuration for the child node respectively to the IAB-node and child node of the IAB-node, thereby facilitating the IAB-node and the child node to simultaneously perform migration of transmission paths when the IAB-node moves within a donor-DU or between donor-DUs.

EMBODIMENT OF A SECOND ASPECT

At least address to the same problem as the embodiment of the first aspect of this disclosure, the embodiment of the second aspect of this disclosure provides a method for transmitting and receiving a signal, corresponding to the method of the embodiment of the first aspect. The method of the embodiment of the second aspect of this disclosure is applicable to a second donor-CU in a process of migrating an IAB-node under control of a first donor central unit (donor-CU) from a first distribution unit (DU) to a second DU, wherein the first DU belongs to a first donor-CU, the second DU belongs to a second donor-CU, and the first DU is different from the second DU, that is, the IAB-node is migrated between different donor-CUs.

Figure 4:
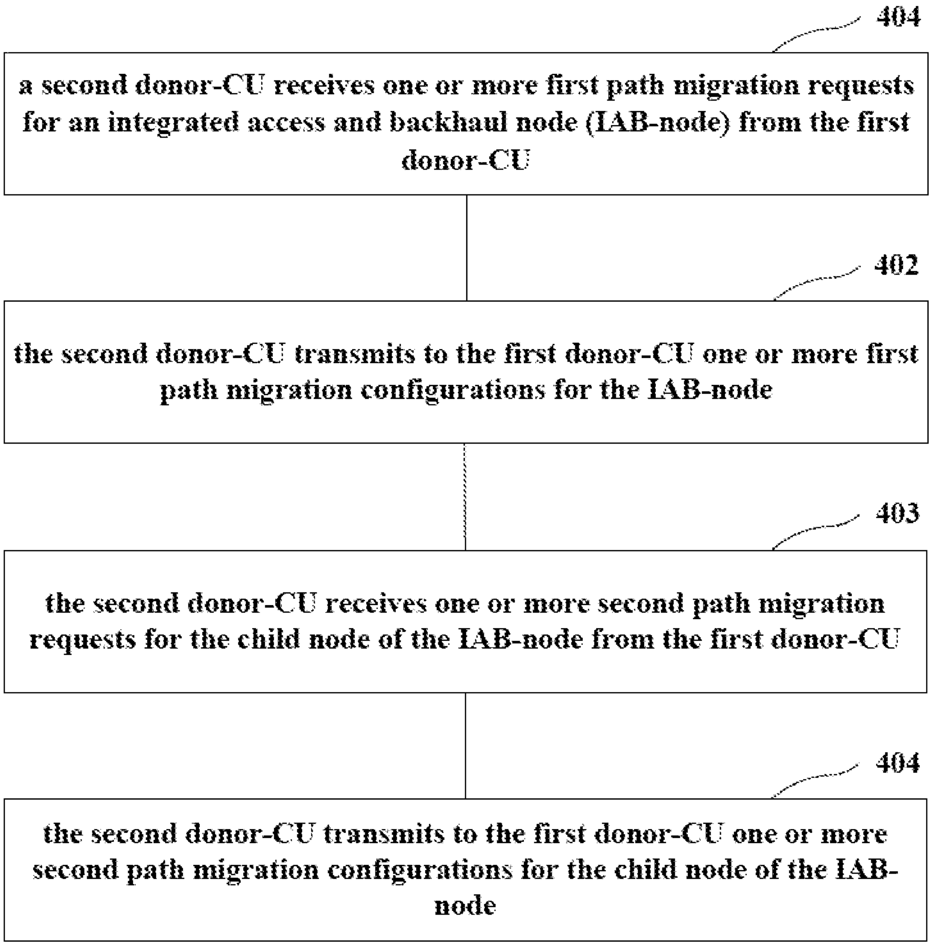
FIG. 4 is a schematic diagram of the method for transmitting and receiving a signal of an embodiment of a second aspect of this disclosure.

FIG. 4 is a schematic diagram of the method for transmitting and receiving a signal of the embodiment of the second aspect of this disclosure. As shown in FIG. 4, the method includes:

operation 401: a second donor-CU receives one or more first path migration requests for an integrated access and backhaul node (IAB-node) from the first donor-CU;

operation 402: the second donor-CU transmits to the first donor-CU one or more first path migration configurations for the IAB-node;

operation 403: the second donor-CU receives one or more second path migration requests for the child node of the IAB-node from the first donor-CU; and operation 404: the second donor-CU transmits to the first donor-CU one or more second path migration configurations for the child node of the IAB-node.

The first path migration requests correspond to a first candidate cell of the IAB-node, and the second path migration requests correspond to a second candidate cell of the IAB-node, the first path migration configurations correspond to a first candidate cell of the IAB-node or a DU to which the first candidate cell belongs, and the second path migration configurations correspond to a second candidate cell of the IAB-node or a DU to which the second candidate cell belongs.

In at least one embodiment, the first path migration requests at least include a cell ID of the first candidate cell of the IAB-node, and the second path migration requests at least include the cell ID of the second candidate cell of the IAB-node.

The first path migration configurations and the second path migration configurations at least include at least one of the following parameters:

an IP address routable to the DU to which the first candidate cell belongs, a routing ID, a radio link control (RLC) channel ID, or a new backhaul adaptation protocol (BAP) address.

In at least one embodiment, the second donor-CU may receive the first path migration requests for the IAB-node via a handover request message or a secondary node addition request message, and furthermore, the second donor-CU transmits the first path migration configurations for the IAB-node via a handover request acknowledge message or a secondary node addition request acknowledge message.

In at least one embodiment, the second donor-CU receives the second path migration requests for the child node via a handover request message or a secondary node addition request message, or receives the second path migration requests for the child node via a path migration request message, and furthermore, the second donor-CU transmits the second path migration configurations for the child node of the IAB-node via a handover request acknowledge message or a secondary node addition request acknowledge message, or transmits the second path migration configurations for the child node via a path migration request acknowledge message.

The method for transmitting and receiving a signal in the embodiment of the first aspect and the method for transmitting and receiving a signal in the embodiment of the second aspect shall be described below with reference to particular embodiments.

EMBODIMENT 1

In Embodiment 1, how the child node performs migration of the F1 transmission path when the IAB-node performs conditional handover (CHO) or establishes conditional dual-connection shall be described by way of examples.

In a case where the IAB-node performs CHO, the IAB-node may be configured with multiple candidate cells, and when signal quality of the candidate cells satisfies a condition, the IAB-node is accessed to different candidate cells. The access of the IAB node to different candidate cells forms different network topologies, i.e. different F1 transmission paths. Both the IAB nodes and child node need to perform F1 migration configuration on candidate cells of multiple IAB nodes.

If the IAB-node performs CHO between donor-CUs, the original donor-CU may request F1 migration configurations of one or more candidate cells from the target donor-CU or the secondary node donor-CU. Each handover request message or secondary node addition request (S-Node addition request) message contains conditional handover information for a candidate cell. The target donor-CU or secondary node donor-CU configures F1 migration parameters of the IAB node and child node for each candidate cell or the DU to which the candidate cell belongs. As different candidate cell DUs lead to different F1 transmission paths, if two candidate cells belong to the same DU, the target transmission paths are identical. Hence, F1 migration parameters may be configured for different DUs.

The original donor-CU may independently request the F1 migration configuration of the child node, and for the child node request F1 migration configurations of candidate cells of one or more IAB-nodes from the target donor-CU or the secondary node donor-CU by using the F1 migration request message. Each F1 migration request message is for a candidate cell of an IAB-node.

The target donor-CU or secondary node donor-CU configures F1 migration parameters for the IAB-node or child node and generates an RRC reconfiguration message for a candidate cell or DU of each IAB-node. The RRC reconfiguration message includes: an IP address routable to the DU to which the candidate cell belongs, a routing ID, a radio link control (RLC) channel ID, and a new BAP address, etc. The RRC reconfiguration message for the IAB-node is included in an RRC container of a handover request acknowledge message transmitted by the target donor-CU or a secondary node (S-Node) addition request acknowledge message transmitted by the secondary node donor-CU. After receiving the RRC reconfiguration message, the original donor-CU forms RRC reconfiguration messages in multiple containers and an IAB-node candidate cell ID to which each RRC reconfiguration message corresponds or an ID of a DU to which the candidate cells belong into one RRC reconfiguration message, and transmits it to the IAB-node. The RRC reconfiguration message for the child node is included in an RRC container of a handover request acknowledge message transmitted by the target donor-CU or a secondary node (S-Node) addition request acknowledge message transmitted by the secondary node donor-CU, or is included in an RRC container of an F1 migration acknowledge message transmitted by the target donor-CU or the secondary node donor-CU. After receiving the RRC reconfiguration message, the original donor-CU forms RRC reconfiguration messages in multiple containers and an IAB-node candidate cell ID to which each RRC reconfiguration message corresponds or an ID of a DU to which the candidate cells belong into one RRC reconfiguration message, and transmits it to the child node.

If the IAB-node performs CHO or conditional dual-connection establishment within the same donor-CU, the F1 migration parameters configured by donor-CU for the IAB-node or child node are also for candidate cells of each IAB-node or DUs to which the candidate cells belong, so as to generate an RRC reconfiguration message including a new IP address anchored in the DU, a routing ID, a default radio link control (RLC) channel and a new backhaul adaptation protocol (BAP) address. The donor-CU forms multiple RRC reconfiguration messages and an IAB-node candidate cell ID or target DU ID to which each RRC reconfiguration message corresponds into one RRC reconfiguration message, and transmits it to the IAB-node or the child node.

When the IAB-node transmits the F1 migration configuration to the child node before the path migration, the F1 migration configuration may be conditional configuration, that is, the configuration is executed only when a condition is satisfied. For example, the RRC reconfiguration is performed only when a migration success indication from the parent node is received. The original donor-CU may set an execution condition and transmit an RRC message containing the F1 migration configuration and a corresponding execution condition to the child node. The migration success indication is used to indicate that the IAB-node has been successfully accessed to a candidate cell, including a candidate cell ID of the IAB-node or an ID of the DU to which the candidate cell belongs, the candidate cell ID being a global cell ID or a physical cell ID of the cell, and the ID of the DU being a BAP address of the DU. Hence, the child node may perform path migration on the same candidate cell simultaneously with the IAB node.

Figure 5:
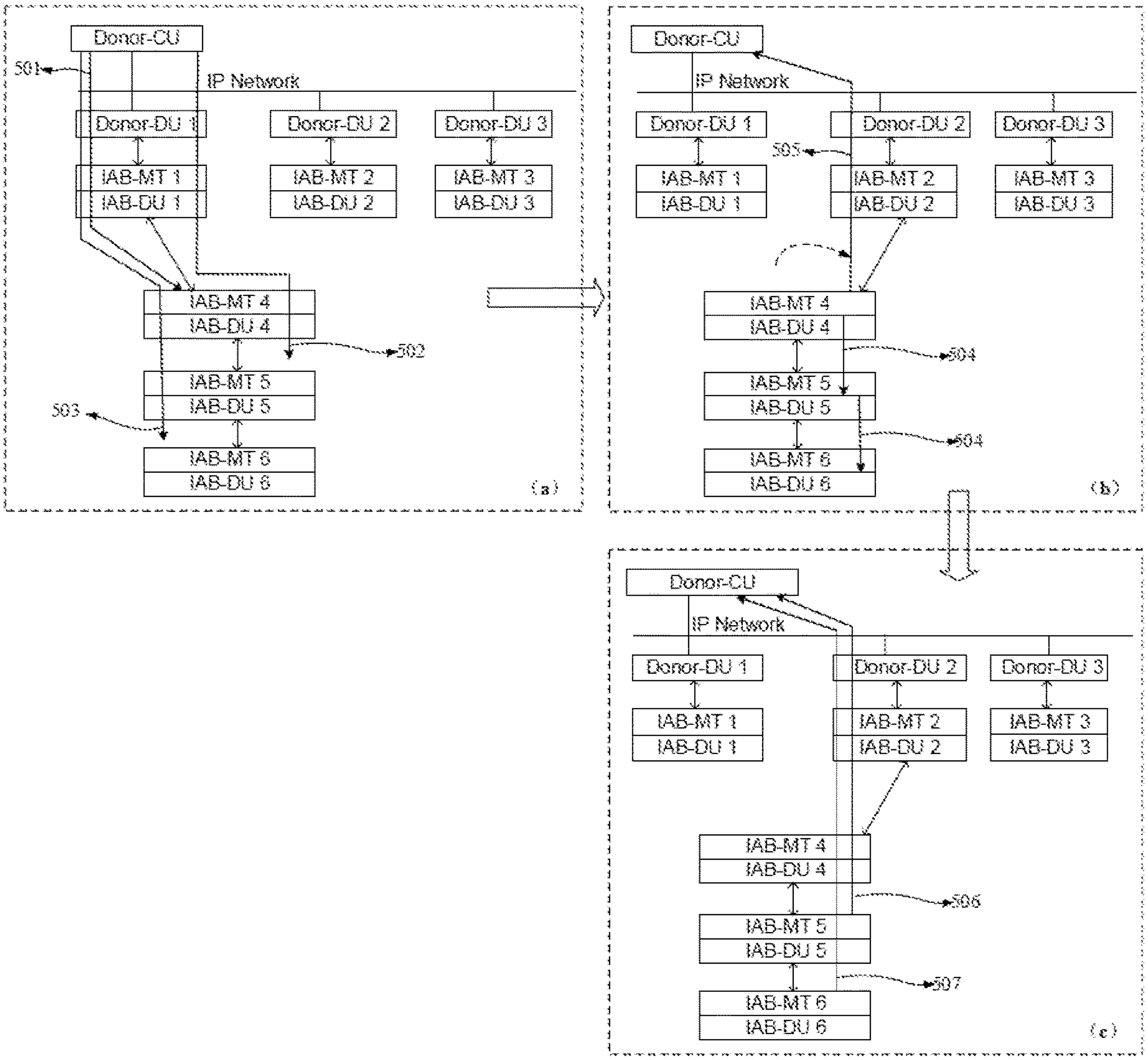
FIG. 5 is a schematic diagram of performing conditional handover by the IAB-node in the embodiment of the first aspect.

FIG. 5 is a schematic diagram of performing conditional handover by the IAB-node in Embodiment 1.

As shown in (a) of FIG. 5, before the condition handover, the RRC reconfiguration message is transmitted via the original path to IAB-node 4 (as shown in 501), child node IAB-node 5 (as shown in 502) and IAB-node 6 (as shown in 503).

As shown in (b) of FIG. 5, IAB-node 4 is handed over to DU 2 to form a new path (i.e. a target path); as shown in 504, IAB-node 4 transmits an F1 migration indication to child nodes IAB-node 5 and IAB-node6; and as shown in 505, IAB-node 4 transmits an RRC reconfiguration complete (RRC ReconfigComplete) message to the donor-CU via the target path.

As shown in (c) of FIG. 5, child node IAB-node 5 and IAB-node 6 shown by 506 and 507 transmit an RRC reconfiguration complete (RRC ReconfigComplete) message to the donor-CU via the target path.

Figure 6:
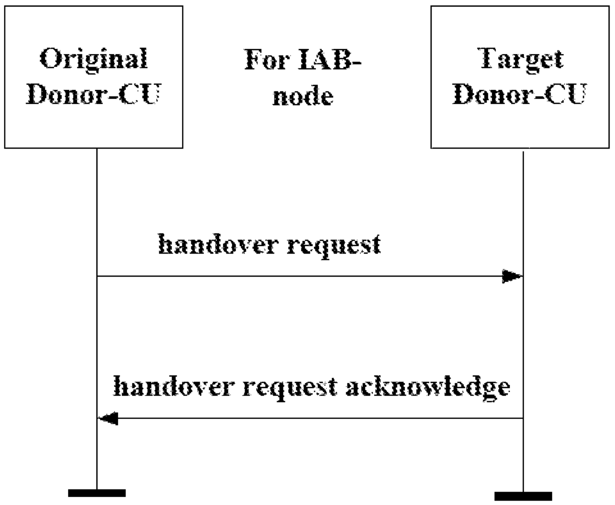
FIG. 6 is a schematic diagram of preparations made by an original donor-CU and a target donor-CU before performing migration of the IAB-node.

FIG. 6 is a schematic diagram of preparations made by the original donor-CU and the target donor-CU before performing migration of the IAB-node. As shown in FIG. 6, the F1 migration request for the IAB-node may be included in the handover request for the IAB-node and transmitted, and the F1 migration response may be included in the handover request acknowledge.

Figure 7:
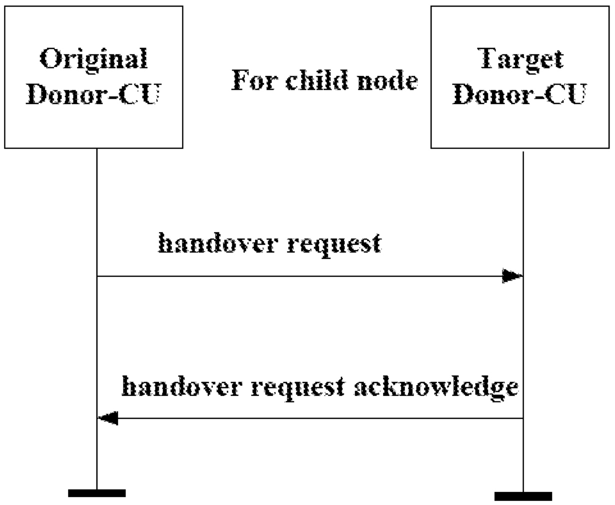
FIG. 7 is a schematic diagram of preparations made by the original donor-CU and the target donor-CU before performing migration of a child node.

FIG. 7 is a schematic diagram of preparations made by the original donor-CU and the target donor-CU before performing migration of the child node. As shown in FIG. 7, the F1 migration request for the child node may be included in a handover request F1 migration acknowledge included in the handover request acknowledge for the IAB-node and transmitted.

Figure 8:
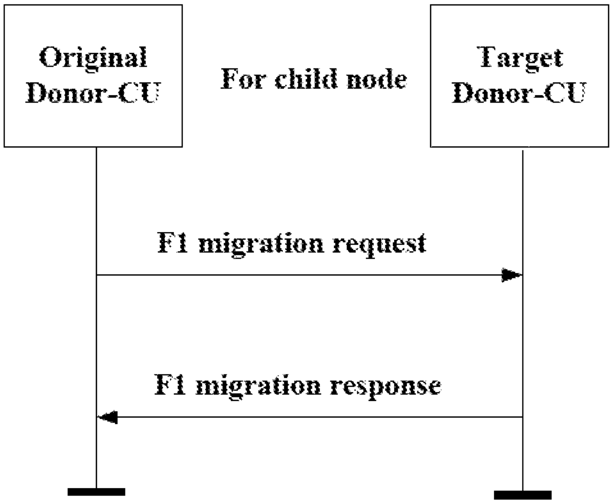
FIG. 8 is another schematic diagram of preparations made by the original donor-CU and the target donor-CU before performing migration of the child node.

FIG. 8 is another schematic diagram of preparations made by the original donor-CU and the target donor-CU before performing migration of the child node. As shown in FIG. 8, the F1 migration request for the child node may be transmitted separately, and an F1 migration response for the child node may also be transmitted separately.

In this embodiment, if the IAB-node executes CHO, the original donor-CU may include conditional handover information in the handover request, requesting F1 migration configurations for one or more candidate cells of the IAB-node.

According to the embodiment of the second aspect of this disclosure, the first donor-DU may request the second donor-DU for path migration configuration, and transmits the first path migration configuration for the IAB-node and the second path migration configuration for the child node respectively to the IAB-node and child node of the IAB-node, thereby facilitating the IAB-node and the child node to simultaneously perform migration of transmission paths when the IAB-node moves within a donor-DU or between donor-DUs.

EMBODIMENT OF A THIRD ASPECT

At least address to the same problem as the embodiment of the first aspect of this disclosure, the embodiment of the third aspect of this disclosure provides a method for transmitting and receiving a signal, corresponding to the method of the embodiment of the first aspect. The method of the embodiment of the third aspect of this disclosure is applicable to an IAB-node in a process of migrating the IAB-node under control of a first donor central unit (donor-CU) from a first distribution unit (DU) to a second DU.

Figure 9:
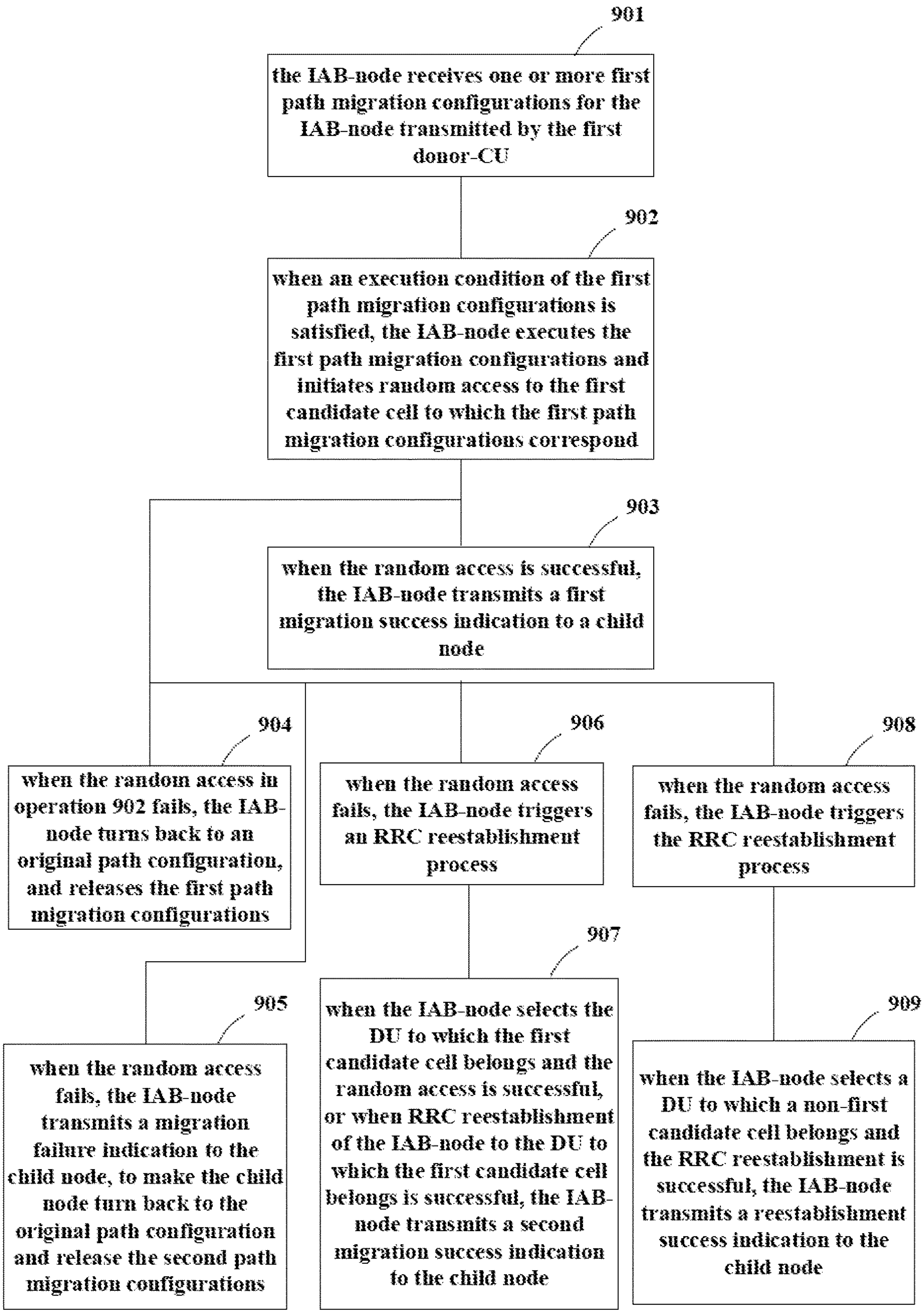
FIG. 9 is a schematic diagram of the method for transmitting and receiving a signal of an embodiment of a third aspect of this disclosure.

FIG. 9 is a schematic diagram of the method for transmitting and receiving a signal of the embodiment of the third aspect of this disclosure. As shown in FIG. 9, the method includes:

operation 901: the IAB-node receives one or more first path migration configurations for the IAB-node transmitted by the first donor-CU, wherein the first path migration configurations correspond to a first candidate cell of the IAB-node or a DU to which the first candidate cell of the IAB-node belongs;

operation 902: when an execution condition of the first path migration configurations is satisfied, the IAB-node executes the first path migration configurations and initiates random access to the first candidate cell to which the first path migration configurations correspond; and operation 903: when the random access is successful, the IAB-node transmits a first migration success indication to a child node.

According to the embodiment of the third aspect of this disclosure, the IAB-node and the child node are facilitated to simultaneously perform migration of transmission paths when the IAB-node moves within a donor-DU or between donor-DUs, thereby reducing interruption of service times in the process of path migration.

In at least one embodiment, the first migration success indication includes a cell ID of the first candidate cell or an ID of the DU to which the first candidate cell belongs.

Whether the second migration configuration is executed after the child node receives the first migration success indication is determined according to whether the first candidate cell for the IAB-node and the second candidate cell for the child node are identical. For example, when the first candidate cell is identical to the second candidate cell, or when the DU to which the first candidate cell belongs is identical to the DU to which the second candidate cell belongs, it indicates that the child node saves the path configuration in the same candidate cell as the IAB node, and the child node executes the second path migration configuration to which the second candidate cell or the DU to which the second candidate cell belongs corresponds; for another example, when the first candidate cell is different from the second candidate cell, or when the DU to which the first candidate cell belongs is different from the DU to which the second candidate cell belongs, it indicates that the child node does not have the path configuration in the same candidate cell as the IAB-node, the child node is unable to achieve path migration simultaneously with the IAB-node, and does not perform the second path migration configuration.

Therefore, if the IAB-node is configured with paths for multiple candidate cells, when the path migration of the IAB-node is successful, the child nodes may simultaneously perform paths migration according to the cell to which the IAB-node is migrated, thereby reducing interruption of service times.

As shown in FIG. 9, the method further includes:

operation 904: when the random access in operation 902 fails, the IAB-node falls back to an original path configuration, and releases the first path migration configurations.

As shown in FIG. 9, the method further includes:

operation 905: when the random access fails, the IAB-node transmits a migration failure indication to the child node, to make the child node fall back to the original path configuration and release the second path migration configurations.

As shown in FIG. 9, the method further includes:

operation 906: when the random access fails, the IAB-node triggers an RRC reestablishment process; and operation 907: when the IAB-node selects the DU to which the first candidate cell belongs and the random access is successful, or when RRC reestablishment of the IAB-node to the DU to which the first candidate cell belongs is successful, the IAB-node transmits a second migration success indication to the child node.

According to operation 907, in the case where the IAB-node is reestablished to the first candidate cell, it may transmit a second migration success indication to the child node.

In operation 907, the second migration success indication includes a cell ID of the first candidate cell or an ID of the DU to which the first candidate cell belongs.

According to the above method, in the case where the IAB-node is reestablished to a candidate cell after the handover fails, the child node may also perform the second migration configuration; however, it needs to be determined according to whether the first candidate cell for the IAB-node and the second candidate cell for the child node are identical. For example, when the first candidate cell is identical to the second candidate cell, or when the DU to which the first candidate cell belongs is identical to the DU to which the second candidate cell belongs, it indicates that the child node saves the path configuration in the same candidate cell as the IAB-node. Upon receiving the second migration indication, the child node executes the second path migration configuration to which the second candidate cell or the DU to which the second candidate cell belongs corresponds; and when the first candidate cell is different from the second candidate cell, or when the DU to which the first candidate cell belongs is different from the DU to which the second candidate cell belongs, it indicates that the child node does not have the path configuration in the same candidate cell as the IAB-node, the child node is unable to achieve path migration simultaneously with the IAB-node, and does not perform the second path migration configuration.

Therefore, when the IAB node is reestablished to the candidate cell after the handover fails, the child node may perform path migration correctly, thereby achieving path migration simultaneously with the IAB, and reducing interruption of service times.

As shown in FIG. 9, the method further includes:

operation 908: when the random access fails, the IAB-node triggers the RRC reestablishment process; and operation 909: when the IAB-node selects a DU to which a non-first candidate cell belongs and the RRC reestablishment is successful, the IAB-node transmits a reestablishment success indication to the child node.

According to operation 909, in a case where the IAB-node is reestablished to the non-first candidate cell (such as an original cell or another cell than the first candidate cell and the original cell), it may transmit the second migration success indication to the child nod.

In operation 909, the reestablishment success indication includes an ID of a cell where the IAB-node performs RRC reestablishment or an ID of a DU to which a cell where the IAB-node performs RRC reestablishment belongs.

According to the above method, when the IAB-node is reestablished to the non-first candidate cell, the child node may also perform the second migration configuration; however, it needs to be determined according to whether the candidate cell to which the IAB-node is reestablished and the second candidate cell for the child node are identical. For example, when the candidate cell to which the IAB-node is reestablished is identical to the second candidate cell, or when a DU to which the candidate cell to which the IAB-node is reestablished belongs is identical to the DU to which the second candidate cell belongs, it indicates that the child node saves path configuration in the candidate cell to which the IAB-node is reestablished. Upon receiving the second migration indication, the child node executes the second path migration configuration to which the second candidate cell or the DU to which the second candidate cell belongs corresponds; and when the candidate cell to which the IAB-node is reestablished is different from the second candidate cell, or when the DU to which the candidate cell to which the IAB-node is reestablished belongs is different from the DU to which the second candidate cell belongs, it indicates that the child node does not have the path configuration in the candidate cell to which the IAB-node is reestablished, the child node is unable to achieve path migration to the candidate cell to which the IAB-node is reestablished, and does not perform the second path migration configuration.

Therefore, when the IAB-node is reestablished to a non-candidate cell, the child node may achieve path migration to the candidate cell to which the IAB-node is reestablished. Hence, after the IAB-node is successful in reestablishment, there is no need to configure paths for the child node, so that the network updates the network topology as soon as possible, thereby reducing interruption of service times.

The method for transmitting and receiving a signal in FIG. 9 shall be described below with reference to particular embodiments.

EMBODIMENT 2

Embodiment 2 is used to explain: processing where when the IAB-node moves in the same donor-CU or in DUs under different donor-CUs, in the case where the RRC message containing the migration F1 transmission path configuration is transmitted to the child node of the IAB-node via the original path, that is, the RRC reconfiguration message is transmitted to the child node before the IAB-node completes the handover, if the handover of the IAB-node fails.

As the IAB-node falls back to the original cell configuration when the handover fails (for example, T304 expires), it selects a new cell for RRC reestablishment, and at this moment, the IAB-node may not necessarily select the target cell and target donor-CU for reestablishment. In order to reduce latency of service interruption, a processing method is to make the F1 transmission configuration of the child node fall back to the original configuration. When the IAB-node fails in handover, the IAB-node transmits a handover failure indication to the child node. If the child node has already applied the F1 transmission configuration at the target side, it returns back to the F1 transmission configuration at the original side and releases the F1 transmission configuration at the target side. After the IAB-node completes reestablishment, the donor-CU transmits a new F1 transmission configuration.

In another method, in order to further reduce service interruption, when the IAB-node is reestablished to the original cell or the target cell, the child node is made to perform relevant F1 transmission path migration, which includes the following three situations.

Situation 1: the IAB node fails in handover, and is reestablished to the target cell (i.e. the first candidate cell).

A target cell reestablishment indication is transmitted to the child node. If the child node has not yet applied the F1 transmission configuration at the target side, the child node is made to perform the F1 transmission path migration at the target side and release the F1 transmission path configuration at the target side. This may prevent the donor-CU from transmitting the RRC reconfiguration message to child node again, and may establish a new network topology as soon as possible, thereby reducing service interruption.

Situation 2: the IAB node fails in handover, and is reestablished to the original cell.

An original cell reestablishment indication to the child node, and if the child node has applied the F1 transmission configuration at the target side, the child node is made to fall back to the original F1 transmission configuration. This may make the network to quickly recover the original topology, thereby reducing service interruption.

Situation 3: the IAB node fails in handover, and is reestablished to another cell.

The IAB-node transmits a reestablishment indication to the child node. If the child node has already applied the F1 transmission configuration at the target side, it falls back to the F1 transmission configuration at the original side and release the F1 transmission configuration at the target side. After the IAB-node completes the reestablishment, the donor-CU transmits new F1 transmission configuration. This may make the child node to fall back to the original topology, and after the IAB-node completes the reestablishment, the donor-CU performs new F1 transmission configuration.

In addition, in order to prevent the IAB-node from being unable to complete handover or reestablishment for a long time, a timer is started after the child node receives the F1 transmission configuration at the target side. If no indication is received from any IAB-node when the timer expires, the child node falls back to the F1 transmission configuration of the original cell and trigger RRC reestablishment of the child node. Configuration of the timer and the F1 transmission configuration at the target side may be transmitted to the child node via the same RRC reconfiguration message.

Figure 11:
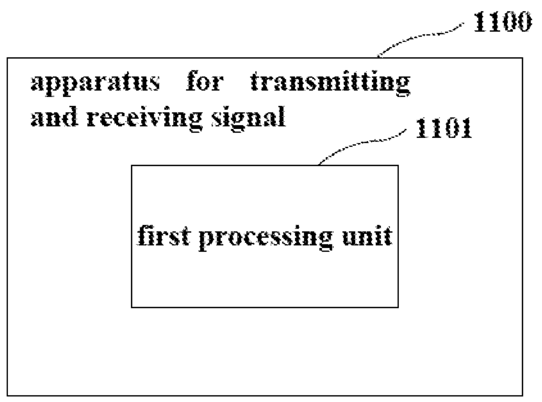
FIG. 11 is a schematic diagram of the apparatus for transmitting and receiving a signal of an embodiment of this disclosure.

Reference may be made to the description of Embodiment 1 in the embodiment of the second aspect for other related contents in the specific implementations of the method shown in FIG. 11.

According to the embodiment of the third aspect of this disclosure, the IAB-node and the child node are facilitated to simultaneously perform migration of transmission paths when the IAB-node moves within a donor-DU or between donor-DUs, thereby reducing interruption of service times in the process of path migration.

EMBODIMENT OF A FOURTH ASPECT

At least address to the same problem as the embodiment of the third aspect of this disclosure, the embodiment of the third aspect of this disclosure provides a method for transmitting and receiving a signal, corresponding to the method of the embodiment of the third aspect. The method of the embodiment of the third aspect of this disclosure is applicable to a child node in a process of migrating the IAB-node under control of a first donor central unit (donor-CU) from a first distribution unit (DU) to a second DU.

Figure 10:
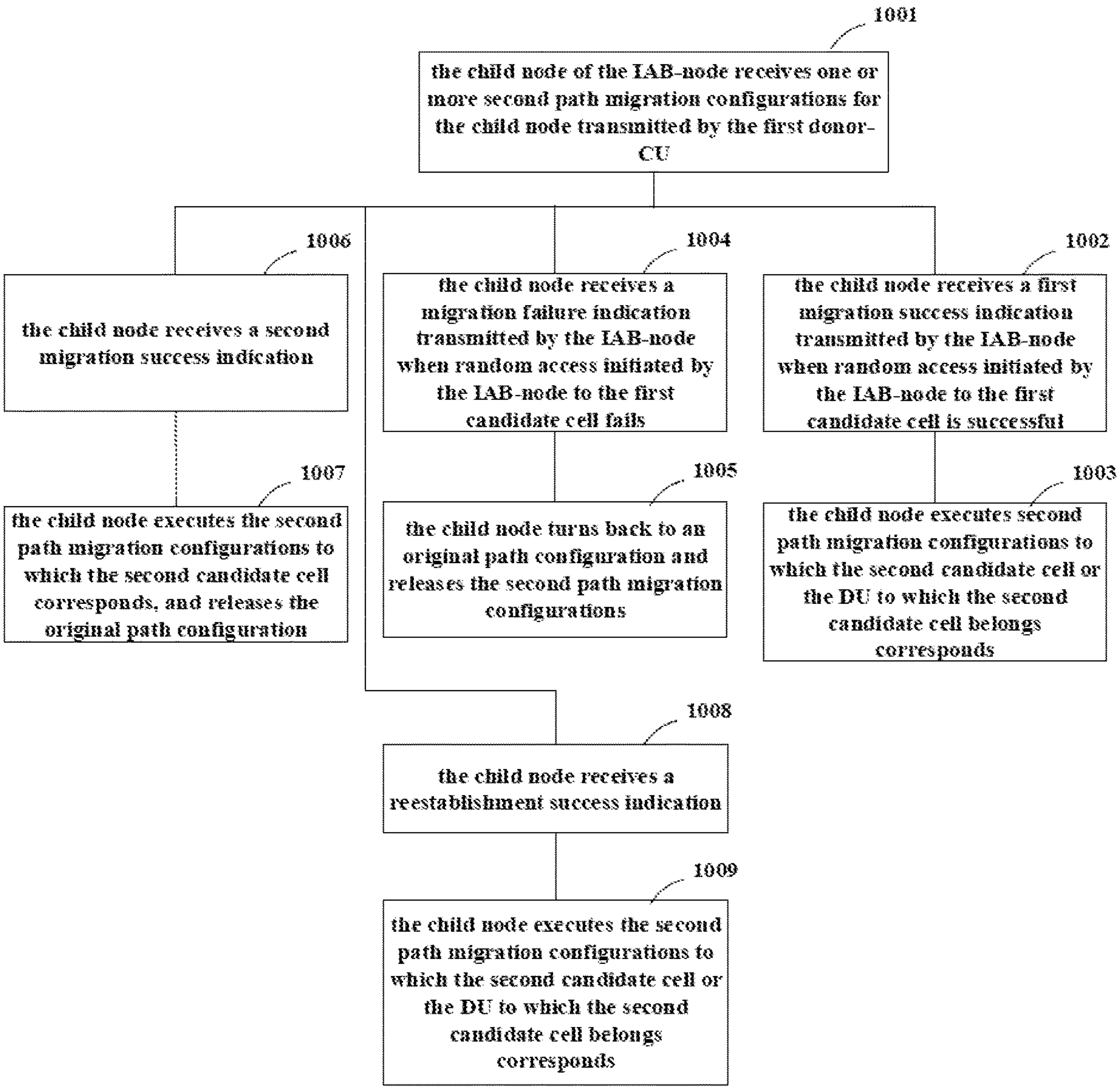
FIG. 10 is a schematic diagram of the method for transmitting and receiving a signal of an embodiment of a fourth aspect of this disclosure.

FIG. 10 is a schematic diagram of the method for transmitting and receiving a signal of the embodiment of the third aspect of this disclosure. As shown in FIG. 10, the method includes:

operation 1001: the child node of the IAB-node receives one or more second path migration configurations for the child node transmitted by the first donor-CU, wherein the second path migration configurations correspond to a second candidate cell of the IAB-node or a DU to which a second candidate cell of the IAB-node belongs.

As shown in FIG. 10, the method further includes:

operation 1002: the child node receives a first migration success indication transmitted by the IAB-node when random access initiated by the IAB-node to the first candidate cell is successful; and operation 1003: the child node executes second path migration configurations to which the second candidate cell or the DU to which the second candidate cell belongs corresponds.

In operation 1002, the first migration success indication includes a cell ID of the first candidate cell or an ID of a DU to which the first candidate cell belongs.

In operation 1003, when the first candidate cell is identical to the second candidate cell or the DU to which the first candidate cell belongs is identical to the DU to which the second candidate cell belongs, the child node executes the second path migration configurations corresponding to the second candidate cell or the DU to which the second candidate cell belongs.

Furthermore, when the first candidate cell and the second candidate cell are different or the DU to which the first candidate cell belongs and the DU to which the second candidate cell belongs are different, the child node falls back to the original path configuration and releases the second path migration configurations.

Hence, if the IAB-node is configured with paths for multiple cells, after the path migration of the IAB-node is successful, the child node may simultaneously perform path migration according to the cell to which the IAB-node is migrated, thereby reducing interruption of service times.

As shown in FIG. 10, the method further includes:

operation 1004: the child node receives a migration failure indication transmitted by the IAB-node when random access initiated by the IAB-node to the first candidate cell fails; and operation 1005: the child node falls back to an original path configuration and releases the second path migration configurations.

Hence, when the random access to the first candidate cell initiated by the IAB-node fails, the child node falls back to the original path configuration and releases the second path migration configuration.

As shown in FIG. 10, the method further includes:

operation 1006: the child node receives a second migration success indication; and operation 1007: the child node executes the second path migration configurations to which the second candidate cell corresponds, and releases the original path configuration.

The second migration success indication is transmitted by the IAB-node when the IAB-node selects the DU to which the first candidate cell belongs to perform RRC reestablishment and the random access is successful or when the RRC reestablishment of the IAB-node to the DU to which the first candidate cell belongs is successful. The second migration success indication indicates that the IAB-node is reestablished to the first candidate cell.

In at least one embodiment, the second migration success indication includes a cell ID of the first candidate cell or an ID of the DU to which the first candidate cell belongs.

In operation 1007, when the first candidate cell is identical to the second candidate cell or the DU to which the first candidate cell belongs is identical to the DU to which the second candidate cell belongs, the child node executes the second path migration configurations corresponding to the second candidate cell or the DU to which the second candidate cell belongs.

Furthermore, when the first candidate cell and the second candidate cell are different or the DU to which the first candidate cell belongs and the DU to which the second candidate cell belongs are different, the child node falls back to the original path configuration and releases the second path migration configurations.

Hence, when the IAB-node fails in handover and is reestablished to a candidate cell, the child node may perform correct path migration, thereby achieving performing path migration by the IAB-node and the child node simultaneously, and reducing interruption of service times.

As shown in FIG. 10, the method further includes:

operation 1008: the child node receives a reestablishment success indication; and operation 1009: the child node executes the second path migration configurations to which the second candidate cell or the DU to which the second candidate cell belongs corresponds.

The reestablishment success indication is transmitted by the IAB-node when the IAB-node selects a DU to which the first candidate cell does not belong to perform RRC reestablishment and the RRC reestablishment is successful. The non-first candidate cell may be the original cell, or may be another cell than the first candidate cell and the original cell.

The reestablishment success indication includes an ID of a cell where the IAB-node performs RRC reestablishment or an ID of a DU to which a cell where the IAB-node performs RRC reestablishment belongs.

In operation 1009, when the cell where the IAB-node performs RRC reestablishment is identical to the second candidate cell or a DU to which the cell where the IAB-node performs RRC reestablishment belongs is identical to the DU to which the second candidate cell belongs, the child node executes the second path migration configurations corresponding to the second candidate cell or the DU to which the second candidate cell belongs.

Furthermore, when the cell where the IAB-node performs RRC reestablishment is different from the second candidate cell or a DU to which the cell where the IAB-node performs RRC reestablishment belongs is different from the DU to which the second candidate cell belongs, the child node falls back to the original path configuration and releases the second path migration configurations.

Hence, when the IAB-node is reestablished to a non-candidate cell, the child node may achieve migration of a path to the cell where the IAB-node is reestablished. After the IAB-node is successful in reestablishment, it does not need to configure paths for the child node again, and the network is made to update the network topology as soon as possible, thereby reducing interruption of service times.

Reference may be made to the description of Embodiment 1 in the embodiment of the second aspect and the description of Embodiment 2 in the embodiment of the third aspect for other related contents in the specific implementations of the method shown in FIG. 10.

According to the embodiment of the fourth aspect of this disclosure, the IAB-node and the child node are facilitated to simultaneously perform migration of transmission paths when the IAB-node moves within a donor-DU or between donor-DUs, thereby reducing interruption of service times in the process of path migration.

EMBODIMENT OF A FIFTH ASPECT

The embodiment of this disclosure provides an apparatus for transmitting and receiving a signal, applicable to a process of migrating an IAB-node under control of a first donor central unit (donor-CU) from a first distribution unit (DU) to a second DU. The apparatus may be the first donor-CU, or may one or some components or assemblies configured in the first donor-CU. The apparatus corresponds to the method in the embodiment of the first aspect.

FIG. 11 is a schematic diagram of the apparatus for transmitting and receiving a signal of the embodiment of this disclosure. As shown in FIG. 11, the apparatus 1100 for transmitting and receiving a signal includes a first processing unit 1101, the first processing unit being configured to perform control to enable that:

one or more first path migration configurations for an integrated access and backhaul node (IAB-node) are transmitted to the IAB-node; and one or more second path migration configurations for a child node of the IAB-node are transmitted to the child node, wherein the first path migration configurations correspond to a first candidate cell of the IAB-node or a DU to which the first candidate cell of the IAB-node belongs, and the second path migration configurations correspond to a second candidate cell of the IAB-node or a DU to which the second candidate cell of the IAB-node belongs.

In at least one embodiment, in a case where the second DU belongs to a second donor-CU, the first processing unit is further configured to perform control to enable that:

the first donor-CU transmits one or more first path migration requests for the IAB-node to the second donor-CU;

the first donor-CU receives one or more first path migration configurations for the IAB-node from the second donor-CU;

the first donor-CU transmits one or more second path migration requests for the child node of the IAB-node to the second donor-CU; and the first donor-CU receives one or more second path migration configurations for the child node of the IAB-node from the second donor-CU.

The first path migration requests correspond to the first candidate cell of the IAB-node, and the second path migration requests correspond to the second candidate cell of the IAB-node.

The first path migration requests at least include a cell ID of the first candidate cell of the IAB-node, and the second path migration requests at least include the cell ID of the second candidate cell of the IAB-node;

wherein the first path migration configurations and the second path migration configurations at least include at least one of the following parameters:

an IP address routable to the DU to which the first candidate cell belongs, a routing ID, a radio link control (RLC) channel ID, or a new backhaul adaptation protocol (BAP) address.

In at least one embodiment, the first donor-CU transmits the first path migration requests for the IAB-node via a handover request message or a secondary node addition request message, and the first donor-CU receives the first path migration configurations for the IAB-node via a handover request acknowledge message or a secondary node addition request acknowledge message.

In at least one embodiment, the first donor-CU transmits the second path migration requests for the child node via a handover request message or a secondary node addition request message, or transmits the second path migration requests for the child node via a path migration request message.

The first donor-CU receives the second path migration configurations for the child node of the IAB-node via a handover request acknowledge message or a secondary node addition request acknowledge message, or receives the second path migration configurations for the child node via a path migration request acknowledge message.

In at least one embodiment, the first processing unit is further configured to perform control, to enable that:

the first donor-CU transmits an RRC message formed by a candidate cell ID of the IAB-node to which the one or more first path migration configurations for the IAB-node correspond or an ID of a DU to which the candidate cell of the IAB-node belongs to the IAB-node; and the first donor-CU transmits an RRC message formed by a candidate cell ID of the IAB-node to which the one or more second path migration configurations for the child node correspond or the ID of the DU to which the candidate cell of the IAB-node belongs to the child node.

In at least one embodiment, that the first donor-CU transmits the second path migration configuration for the child node to the child node includes:

the first donor-CU transmits the second path migration configuration to the child node before the IAB-node performs path migration.

In at least one embodiment, the first processing unit is further configured to perform control, to enable that:

the first donor-CU sets an execution condition to which the second path migration configurations correspond and transmits the execution condition to the child node, to make the child node execute the second path migration configurations when the child node satisfies the execution condition.

In at least one embodiment, the first processing unit is further configured to perform control, to enable that:

the first donor-CU sets an execution condition to which the first path migration configurations correspond and transmits the execution condition to the IAB-node, to make the IAB-node execute the first path migration configurations when the IAB-node satisfies the execution condition.

EMBODIMENT OF A SIXTH ASPECT

The embodiment of this disclosure provides an apparatus for transmitting and receiving a signal, applicable to a process of migrating an IAB-node under control of a first donor central unit (donor-CU) from a first distribution unit (DU) to a second DU. The apparatus may be a second donor-CU, or may one or some components or assemblies configured in the second donor-CU. The apparatus corresponds to the method in the embodiment of the second aspect.

Figure 12:
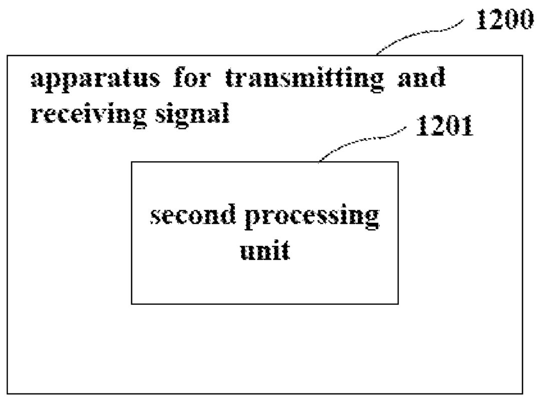
FIG. 12 is a schematic diagram of the apparatus for transmitting and receiving a signal of an embodiment of a sixth aspect of this disclosure.

FIG. 12 is a schematic diagram of the apparatus for transmitting and receiving a signal of the embodiment of the sixth aspect of this disclosure. As shown in FIG. 12, the apparatus includes a second processing unit 1201, the second processing unit being configured to perform control to enable that:

the second donor-CU receives one or more first path migration requests for an integrated access and backhaul node (IAB-node) a from the first donor-CU;

the second donor-CU transmits one or more first path migration configurations for the IAB-node to the first donor-CU;

the second donor-CU receives one or more second path migration requests for the child node of the IAB-node by the second donor-CU from the first donor-CU; and the second donor-CU transmits one or more second path migration configurations for the child node of the IAB-node by the second donor-CU to the first donor-CU.

The first path migration requests correspond to a first candidate cell of the IAB-node, and the second path migration requests correspond to a second candidate cell of the IAB-node, the first path migration configurations correspond to a first candidate cell of the IAB-node or a DU to which the first candidate cell belongs, and the second path migration configurations correspond to a second candidate cell of the IAB-node or a DU to which the second candidate cell belongs.

In at least one embodiment, the first path migration requests at least include a cell ID of the first candidate cell of the IAB-node, and the second path migration requests at least include the cell ID of the second candidate cell of the IAB-node.

The first path migration configurations and the second path migration configurations at least include at least one of the following parameters:

an IP address routable to the DU to which the first candidate cell belongs, a routing ID, a radio link control (RLC) channel ID, or a new backhaul adaptation protocol (BAP) address.

In at least one embodiment, the second donor-CU may receive the first path migration requests for the IAB-node via a handover request message or a secondary node addition request message, and the second donor-CU transmits the first path migration configurations for the IAB-node via a handover request acknowledge message or a secondary node addition request acknowledge message.

In at least one embodiment, the second donor-CU receives the second path migration requests for the child node via a handover request message or a secondary node addition request message, or receives the second path migration requests for the child node via a path migration request message, and the second donor-CU transmits the second path migration configurations for the child node of the IAB-node via a handover request acknowledge message or a secondary node addition request acknowledge message, or transmits the second path migration configurations for the child node via a path migration request acknowledge message.

According to the embodiment of the fifth aspect of this disclosure, the first donor-DU may transmit the first path migration configuration and the second path migration configuration respectively to the IAB-node and child node of the IAB-node, thereby facilitating the IAB-node and the child node to perform migration of transmission paths, and updating the network topology.

EMBODIMENT OF A SEVENTH ASPECT

The embodiment of this disclosure provides an apparatus for transmitting and receiving a signal, applicable to a process of migrating an IAB-node under control of a first donor central unit (donor-CU) from a first distribution unit (DU) to a second DU. The apparatus may be an IAB-node, or may one or some components or assemblies configured in the IAB-node. The apparatus corresponds to the method in the embodiment of the third aspect.

Figure 13:
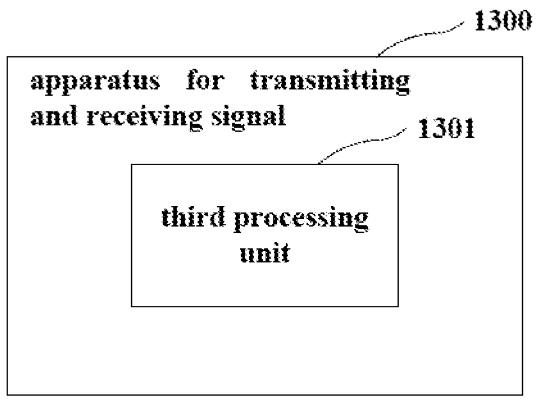
FIG. 13 is a schematic diagram of the apparatus for transmitting and receiving a signal of an embodiment of a seventh aspect of this disclosure.

FIG. 13 is a schematic diagram of the apparatus for transmitting and receiving a signal of the embodiment of the seventh aspect of this disclosure. As shown in FIG. 13, the apparatus includes a third processing unit 1301, the third processing unit 1301 being configured to perform control to enable that:

- the IAB-node receives one or more first path migration configurations for the IAB-node transmitted by the first donor-CU, wherein the first path migration configurations correspond to a first candidate cell of the IAB-node or a DU to which the first candidate cell of the IAB-node belongs; and
- when an execution condition of the first path migration configurations is satisfied, the IAB-node executes the first path migration configurations and initiates random access to the first candidate cell to which the first path migration configurations correspond.

In at least one embodiment, when the random access is successful, the IAB-node transmits a first migration success indication to a child node.

In at least one embodiment, the first migration success indication includes a cell ID of the first candidate cell or an ID of the DU to which the first candidate cell belongs.

In at least one embodiment, the third processing unit is further configured to perform control to enable that when the random access fails, the IAB-node falls back to an original path configuration and releases the first path migration configuration.

In at least one embodiment, when the random access fails, the third processing unit is further configured to perform control to enable that:

- the IAB-node transmits a migration failure indication to the child node, to make the child node fall back to an original path configuration and release the second path migration configurations.

In at least one embodiment, when the random access fails, the third processing unit is further configured to perform control to enable that:

- the IAB-node triggers an RRC reestablishment process; and
- when the IAB-node selects the DU to which the first candidate cell belongs and the random access is successful, or when RRC reestablishment of the IAB-node to the DU to which the first candidate cell belongs is successful, a second migration success indication is transmitted to the child node.

In at least one embodiment, the second migration success indication includes a cell ID of the first candidate cell or an ID of the DU to which the first candidate cell belongs.

In at least one embodiment, when random access fails, the third processing unit is further configured to perform control to enable that:

- the IAB-node triggers the RRC reestablishment process; and
- when the IAB-node selects a DU to which the first candidate cell does not belong and the RRC reestablishment is successful, the IAB-node transmits a reestablishment success indication to the child node.

In at least one embodiment, the reestablishment success indication includes an ID of a cell where the IAB-node performs RRC reestablishment or an ID of a DU to which a cell where the IAB-node performs RRC reestablishment belongs.

EMBODIMENT OF AN EIGHTH ASPECT

The embodiment of this disclosure provides an apparatus for transmitting and receiving a signal, applicable to a process of migrating an IAB-node under control of a first donor central unit (donor-CU) from a first distribution unit (DU) to a second DU. The apparatus may be a child node of an IAB-node, or may one or some components or assemblies configured in the child node. The apparatus corresponds to the method in the embodiment of the fourth aspect.

Figure 14:
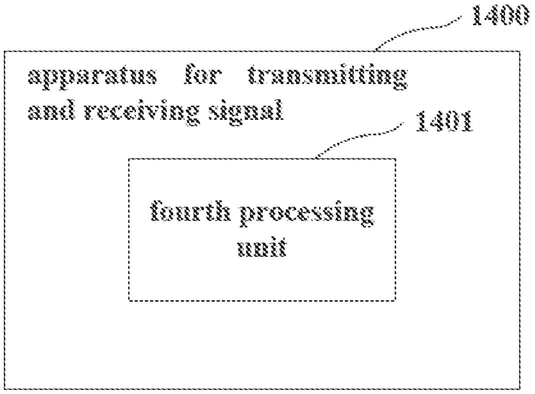
FIG. 14 is a schematic diagram of the apparatus for transmitting and receiving a signal of an embodiment of an eighth aspect of this disclosure.

FIG. 14 is a schematic diagram of the apparatus for transmitting and receiving a signal of the embodiment of the eighth aspect of this disclosure. As shown in FIG. 14, the apparatus for transmitting and receiving a signal includes a fourth processing unit 1401, the fourth processing unit 1401 being configured to perform control to enable that:

- the child node of the IAB-node receives one or more second path migration configurations for the child node transmitted by the first donor-CU, wherein the second path migration configurations correspond to a second candidate cell of the IAB-node or a DU to which a second candidate cell of the IAB-node belongs.

In at least one embodiment, the fourth processing unit 1401 is configured to perform control to enable that:

- the child node receives a first migration success indication transmitted by the IAB-node when random access initiated by the IAB-node to the first candidate cell is successful; and
- the child node executes second path migration configurations to which the second candidate cell or the DU to which the second candidate cell belongs corresponds.

In at least one embodiment, the first migration success indication includes a cell ID of the first candidate cell or an ID of a DU to which the first candidate cell belongs.

In at least one embodiment, when the first candidate cell is identical to the second candidate cell or the DU to which the first candidate cell belongs is identical to the DU to which the second candidate cell belongs, the child node executes the second path migration configurations corresponding to the second candidate cell or the DU to which the second candidate cell belongs.

In at least one embodiment, the fourth processing unit 1401 is configured to perform control to enable that:

- when the first candidate cell is different from the second candidate cell or the DU to which the first candidate cell belongs is different from the DU to which the second candidate cell belongs, the child node falls back to the original path configuration and releases the second path migration configuration.

In at least one embodiment, the fourth processing unit 1401 is configured to perform control to enable that:

the child node receives a migration failure indication transmitted by the IAB-node when random access initiated by the IAB-node to the first candidate cell fails; and the child node falls back to an original path configuration and releases the second path migration configurations.

In at least one embodiment, the fourth processing unit 1401 is configured to perform control to enable that:

the child node receives a second migration success indication; and the child node executes the second path migration configurations to which the second candidate cell corresponds and releases the original path configuration;

wherein the second migration success indication is transmitted by the IAB-node when the IAB-node selects the DU to which the first candidate cell belongs to perform RRC reestablishment and the random access is successful or when the RRC reestablishment of the IAB-node to the DU to which the first candidate cell belongs is successful.

In at least one embodiment, the second migration success indication includes a cell ID of the first candidate cell or an ID of the DU to which the first candidate cell belongs.

In at least one embodiment, when the first candidate cell is identical to the second candidate cell or the DU to which the first candidate cell belongs is identical to the DU to which the second candidate cell belongs, the child node executes the second path migration configurations corresponding to the second candidate cell or the DU to which the second candidate cell belongs.

In at least one embodiment, the fourth processing unit 1401 is configured to perform control to enable that:

when the first candidate cell is different from the second candidate cell or the DU to which the first candidate cell belongs is different from the DU to which the second candidate cell belongs, the child node falls back to the original path configuration and releases the second path migration configuration.

In at least one embodiment, the fourth processing unit 1401 is configured to perform control to enable that:

the child node receives a reestablishment success indication; and the child node falls back to the original path configuration and releases the second path migration configurations;

wherein the reestablishment success indication is transmitted by the IAB-node when the IAB-node selects a DU to which the first candidate cell does not belong to perform RRC reestablishment and the RRC reestablishment is successful.

In at least one embodiment, the reestablishment success indication includes an ID of a cell where the IAB-node performs RRC reestablishment or an ID of a DU to which a cell where the IAB-node performs RRC reestablishment belongs.

In at least one embodiment, when the cell where the IAB-node performs RRC reestablishment is identical to the second candidate cell or a DU to which the cell where the IAB-node performs RRC reestablishment belongs is identical to the DU to which the second candidate cell belongs, the child node executes the second path migration configurations corresponding to the second candidate cell or the DU to which the second candidate cell belongs.

In at least one embodiment, the fourth processing unit 1401 is configured to perform control to enable that:

when the cell where the IAB-node performs RRC reestablishment is different from the second candidate cell or a DU to which the cell where the IAB-node performs RRC reestablishment belongs is different from the DU to which the second candidate cell belongs, the child node falls back to the original path configuration and releases the second path migration configurations.

EMBODIMENT OF A NINTH ASPECT

The embodiment of this disclosure provides a communication system, and reference may be made to FIG. 1, with contents identical to those in the embodiments of the first to eighth aspects being not going to be described herein any further.

In some embodiments, the communication system may include:

a first donor central unit (donor-CU) including the apparatus 1100 for transmitting and receiving a signal as described in the embodiment of the fifth aspect; and an integrated access and backhaul node (IAB-node) including an apparatus 1300 for transmitting and receiving a signal as described in the embodiment of the seventh aspect.

An integrated access and backhaul (IAB) node may include an IAB-MT functional unit and an IAB-DU functional unit, the IAB-MT functional unit having a structure identical to a terminal equipment, and the IAB-DU functional unit and the integrated access and backhaul donor centralized unit (IAB-donor CU) having a structure identical to a network device.

Figure 15:
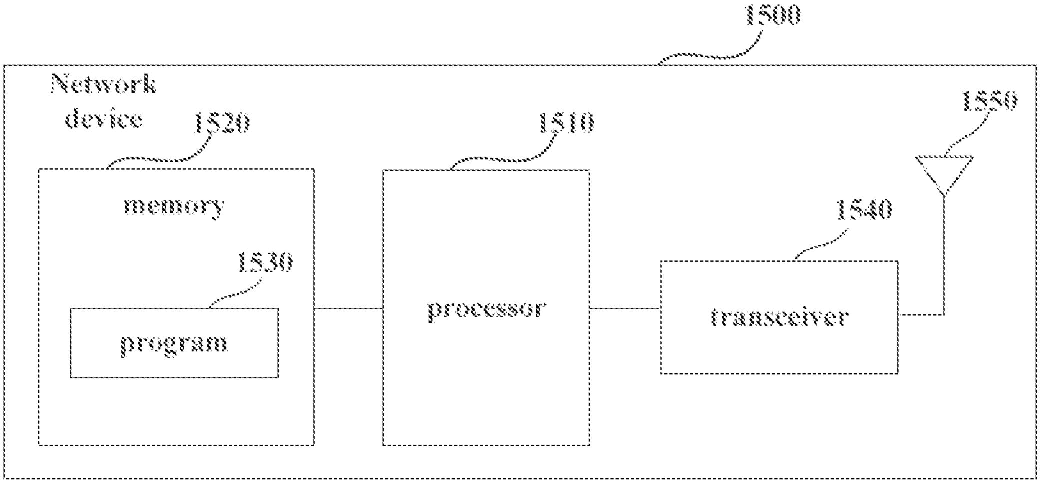
FIG. 15 is a schematic diagram of a structure of the network device of an embodiment of this disclosure.

FIG. 15 is a schematic diagram of a structure of the network device of the embodiment of this disclosure. As shown in FIG. 15, a network device 1500 may include a processor 1510 (such as a central processing unit (CPU)) and a memory 1520, the memory 1520 being coupled to the processor 1510. The memory 1520 may store various data, and furthermore, it may store a program 1530 for information processing, and execute the program 1530 under control of the processor 1510.

For example, the processor 1510 may be configured to execute a program to carry out the method executed by the IAB-DU in the embodiment of the first aspect or the method executed by the IAB-donor DU in the embodiment of the second aspect.

Furthermore, as shown in FIG. 15, the network device 1500 may include a transceiver 1540, and an antenna 1550, etc. Functions of the above components are similar to those in the related art, and shall not be described herein any further. It should be noted that the network device 1500 does not necessarily include all the parts shown in FIG. 15, and furthermore, the network device 1500 may include parts not shown in FIG. 15, and the related art may be referred to.

Figure 16:
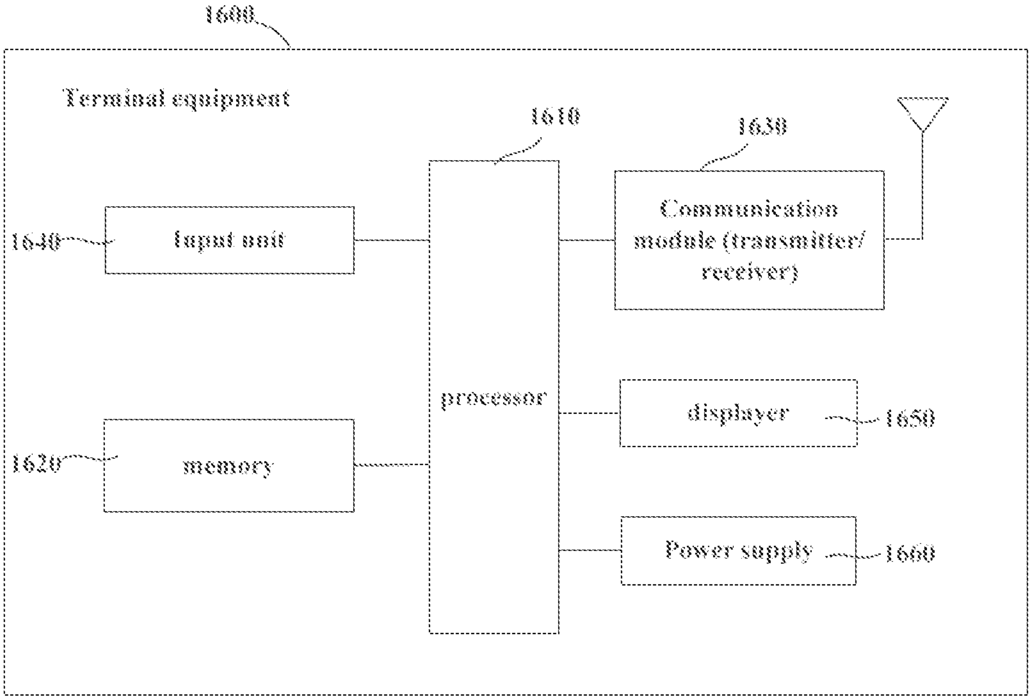
FIG. 16 is a schematic diagram of the terminal equipment of an embodiment of this disclosure.

FIG. 16 is a schematic diagram of the terminal equipment in the embodiment of this disclosure. As shown in FIG. 16, a terminal equipment 1600 may include a processor 1610 and a memory 1620, the memory 1620 storing data and a program and being coupled to the processor 1610. It should be noted that this figure is illustrative only, and other types of structures may also be used, so as to supplement or replace this structure and achieve a telecommunications function or other functions. For example, the processor 1610 may be configured to execute a program to carry out the method executed by the IAB-MT in the embodiment of the first aspect.

As shown in FIG. 16, the terminal equipment 1600 may further include a communication module 1630, an input unit 1640, a display 1650, and a power supply 1660; wherein functions of the above components are similar to those in the related art, which shall not be described herein any further. It should be noted that the terminal equipment 1600 does not necessarily include all the parts shown in FIG. 16, and the above components are not necessary. Furthermore, the terminal equipment 1600 may include parts not shown in FIG. 16, and the related art may be referred to.

Furthermore, the communication system may include a second donor-CU and a child node, the second donor-CU including an apparatus 1200 for transmitting and receiving a signal as described in the embodiment of the sixth aspect, and the child node including an apparatus 1400 for transmitting and receiving a signal as described in the embodiment of the eighth aspect.

An embodiment of this disclosure provides a computer readable program, which, when executed in a donor-CU, causes the donor-CU to carry out the method as described in the embodiment of the first or second aspect.

An embodiment of this disclosure provides a computer storage medium, including a computer readable program, which causes a donor-CU to carry out the method as described in the embodiment of the first or second aspect.

An embodiment of this disclosure provides a computer readable program, which, when executed in an IAB, causes the IAB to carry out the method for transmitting and receiving a signal as described in the embodiment of the third aspect.

An embodiment of this disclosure provides a computer storage medium, including a computer readable program, which causes an IAB to carry out the method for transmitting and receiving a signal as described in the embodiment of the third aspect.

An embodiment of this disclosure provides a computer readable program, which, when executed in a child node, causes the child node to carry out the method for transmitting and receiving a signal as described in the embodiment of the fourth aspect.

An embodiment of this disclosure provides a computer storage medium, including a computer readable program, which causes a child node to carry out the method for transmitting and receiving a signal as described in the embodiment of the fourth aspect.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

As to implementations containing the above embodiments, following supplements are further disclosed.

A method at a first donor-CU side:

1. A method for transmitting and receiving a signal, the method being applicable to a process of migrating an IAB-node under control of a first donor central unit (donor-CU) from a first distribution unit (DU) to a second DU, and including:

transmitting one or more first path migration configurations for an integrated access and backhaul node (IAB-node) by the first donor-CU to the IAB-node; and transmitting one or more second path migration configurations for a child node of the IAB-node by the first donor-CU to the child node, wherein the first path migration configurations correspond to a first candidate cell of the IAB-node or a DU to which the first candidate cell of the IAB-node belongs, and the second path migration configurations correspond to a second candidate cell of the IAB-node or a DU to which the second candidate cell of the IAB-node belongs.

2. The method according to supplement 1, wherein in a case where the second DU belongs to a second donor-CU, the method further includes:

transmitting one or more first path migration requests for the IAB-node by the first donor-CU to the second donor-CU;

receiving one or more first path migration configurations for the IAB-node by the first donor-CU from the second donor-CU;

transmitting one or more second path migration requests for the child node of the IAB-node by the first donor-CU to the second donor-CU; and receiving one or more second path migration configurations for the child node of the IAB-node by the first donor-CU from the second donor-CU, wherein the first path migration requests correspond to the first candidate cell of the IAB-node, and the second path migration requests correspond to the second candidate cell of the IAB-node.

3. The method according to supplement 2, wherein, the first path migration requests at least include a cell ID of the first candidate cell of the IAB-node, and the second path migration requests at least include the cell ID of the second candidate cell of the IAB-node;

wherein the first path migration configurations and the second path migration configurations at least include at least one of the following parameters:

an IP address routable to the DU to which the first candidate cell belongs, a routing ID, a radio link control (RLC) channel ID, or a new backhaul adaptation protocol (BAP) address.

4. The method according to supplement 2, wherein, the first donor-CU transmits the first path migration requests for the IAB-node via a handover request message or a secondary node addition request message;

and the first donor-CU receives the first path migration configurations for the IAB-node via a handover request acknowledge message or a secondary node addition request acknowledge message.

5. The method according to supplement 2, wherein, the first donor-CU transmits the second path migration requests for the child node via a handover request message or a secondary node addition request message, or transmits the second path migration requests for the child node via a path migration request message;

and the first donor-CU receives the second path migration configurations for the child node of the IAB-node via a handover request acknowledge message or a secondary node addition request acknowledge message, or receives the second path migration configuration for the child node via a path migration request acknowledge message.

6. The method according to any one of supplements 1-3, wherein the method further includes:

forming a candidate cell ID of the IAB-node to which the one or more first path migration configurations for the IAB-node correspond or an ID of a DU to which the candidate cell of the IAB-node belongs by the first donor-CU into an RRC message and transmitting the RRC message to the IAB-node; and forming a candidate cell ID of the IAB-node to which the one or more second path migration configurations for the child node correspond or the ID of the DU to which the candidate cell of the IAB-node belongs by the first donor-CU into an RRC message and transmitting the RRC message to the child node.

7. The method according to any one of supplements 1-3, wherein that the first donor-CU transmits the second path migration configurations for the child node to the child node includes:

that the first donor-CU transmits the second path migration configurations to the child node before the IAB-node performs path migration.

8. The method according to any one of supplements 1-3, wherein the method further includes:

setting an execution condition to which the second path migration configurations correspond and transmitting the execution condition to the child node by the first donor-CU, to make the child node execute the second path migration configurations when the child node satisfies the execution condition.

9. The method according to any one of supplements 1-3, wherein the method further includes:

setting an execution condition to which the first path migration configurations correspond and transmitting the execution condition to the IAB-node by the first donor-CU, to make the IAB-node execute the first path migration configurations when the IAB-node satisfies the execution condition.

A method at a second donor-CU side:

1. A method for transmitting and receiving a signal, the method being applicable to a process of migrating an IAB-node under control of a first donor central unit (donor-CU) from a first distribution unit (DU) to a second DU, and including:

receiving one or more first path migration requests for an integrated access and backhaul node (IAB-node) by a second donor-CU from the first donor-CU;

transmitting one or more first path migration configurations for the IAB-node by the second donor-CU to the first donor-CU;

receiving one or more second path migration requests for the child node of the IAB-node by the second donor-CU from the first donor-CU;

transmitting one or more second path migration configurations for the child node of the IAB-node by the second donor-CU to the first donor-CU;

wherein the first path migration requests correspond to a first candidate cell of the IAB-node, and the second path migration requests correspond to a second candidate cell of the IAB-node, the first path migration configurations correspond to a first candidate cell of the IAB-node or a DU to which the first candidate cell belongs, and the second path migration configurations correspond to a second candidate cell of the IAB-node or a DU to which the second candidate cell belongs.

2. The method according to supplement 1, wherein, the first path migration requests at least include a cell ID of the first candidate cell of the IAB-node, and the second path migration requests at least include the cell ID of the second candidate cell of the IAB-node;

and the first path migration configurations and the second path migration configurations at least include at least one of the following parameters:

an IP address routable to the DU to which the first candidate cell belongs, a routing ID, a radio link control (RLC) channel ID, or a new backhaul adaptation protocol (BAP) address.

3. The method according to supplement 1, wherein, the second donor-CU receives the first path migration requests for the IAB-node via a handover request message or a secondary node addition request message;

and the second donor-CU transmits the first path migration configurations for the IAB-node via a handover request acknowledge message or a secondary node addition request acknowledge message.

4. The method according to supplement 1, wherein, the second donor-CU receives the second path migration requests for the child node via a handover request message or a secondary node addition request message, or receives the second path migration requests for the child node via a path migration request message;

and the second donor-CU transmits the second path migration configurations for the child node of the IAB-node via a handover request acknowledge message or a secondary node addition request acknowledge message, or transmits the second path migration configurations for the child node via a path migration request acknowledge message.

At an IAB-node side:

1. A method for transmitting and receiving a signal, the method being applicable to a process of migrating an IAB-node from a first distribution unit (DU) of a first donor-CU to a second DU, wherein the method includes:

receiving, by the IAB-node, one or more first path migration configurations for the IAB-node transmitted by the first donor-CU, wherein the first path migration configurations correspond to a first candidate cell of the IAB-node or a DU to which the first candidate cell of the IAB-node belongs;

when an execution condition of the first path migration configurations is satisfied, executing the first path migration configurations by the IAB-node and initiating random access to the first candidate cell to which the first path migration configurations correspond; and when the random access is successful, transmitting a first migration success indication by the IAB-node to a child node.

2. The method according to supplement 1, wherein, the first migration success indication includes a cell ID of the first candidate cell or an ID of the DU to which the first candidate cell belongs.

3. The method according to supplement 1, wherein the method further includes:

when the random access fails, falling back to an original path configuration by the IAB-node, and releasing the first path migration configurations by the IAB-node.

4. The method according to supplement 3, wherein when the random access fails, the method further includes:

transmitting a migration failure indication by the IAB-node to the child node, to make the child node fall back to an original path configuration and release the second path migration configurations.

5. The method according to supplement 3, wherein when the random access fails, the method further includes:

triggering an RRC reestablishment process by the IAB-node; and when the IAB-node selects the DU to which the first candidate cell belongs and the random access is successful, or when RRC reestablishment of the IAB-node to the DU to which the first candidate cell belongs is successful, transmitting a second migration success indication to the child node.

6. The method according to supplement 5, wherein, the second migration success indication includes a cell ID of the first candidate cell or an ID of the DU to which the first candidate cell belongs.

7. The method according to supplement 3, wherein when the random access fails, the method further includes:

triggering the RRC reestablishment process by the IAB-node; and when the IAB-node selects a DU to which the first candidate cell does not belong and the RRC reestablishment is successful, transmitting a reestablishment success indication to the child node.

8. The method according to supplement 7, wherein, the reestablishment success indication includes an ID of a cell where the IAB-node performs RRC reestablishment or an ID of a DU to which a cell where the IAB-node performs RRC reestablishment belongs.

At a child node side:

1. A method for transmitting and receiving a signal, the method being applicable to a process of migrating an IAB-node under control of a first donor central unit (donor-CU) from a first distribution unit (DU) to a second DU, the method including:

receiving, by the child node of the IAB-node, one or more second path migration configurations for the child node transmitted by the first donor-CU, wherein the second path migration configurations correspond to a second candidate cell of the IAB-node or a DU to which a second candidate cell of the IAB-node belongs;

receiving, by the child node, a first migration success indication transmitted by the IAB-node when random access initiated by the IAB-node to the first candidate cell is successful; and executing second path migration configurations to which the second candidate cell or the DU to which the second candidate cell belongs corresponds by the child node.

2. The method according to supplement 1, wherein, the first migration success indication includes a cell ID of the first candidate cell or an ID of a DU to which the first candidate cell belongs.

3. The method according to supplement 2, wherein, when the first candidate cell is identical to the second candidate cell or the DU to which the first candidate cell belongs is identical to the DU to which the second candidate cell belongs, the child node executes the second path migration configurations corresponding to the second candidate cell or the DU to which the second candidate cell belongs.

4. The method according to supplement 2, wherein the method further includes:

falling back to the original path configuration and releasing the second path migration configurations by the child node when the first candidate cell and the second candidate cell are different or the DU to which the first candidate cell belongs and the DU to which the second candidate cell belongs are different.

5. The method according to supplement 1, wherein the method further includes:

receiving, by the child node, a migration failure indication transmitted by the IAB-node when random access initiated by the IAB-node to the first candidate cell fails; and falling back to an original path configuration and releasing the second path migration configurations, by the child node.

6. The method according to supplement 1, wherein the method further includes:

receiving, by the child node, a second migration success indication; and executing the second path migration configurations to which the second candidate cell corresponds, and releasing the original path configuration, by the child node;

wherein the second migration success indication is transmitted by the IAB-node when the IAB-node selects the DU to which the first candidate cell belongs to perform RRC reestablishment and the random access is successful or when the RRC reestablishment of the IAB-node to the DU to which the first candidate cell belongs is successful.

7. The method according to supplement 6, wherein, the second migration success indication includes a cell ID of the first candidate cell or an ID of the DU to which the first candidate cell belongs.

8. The method according to supplement 7, wherein, when the first candidate cell is identical to the second candidate cell or the DU to which the first candidate cell belongs is identical to the DU to which the second candidate cell belongs, the child node executes the second path migration configurations corresponding to the second candidate cell or the DU to which the second candidate cell belongs.

9. The method according to supplement 8, wherein the method further includes:

falling back to the original path configuration and releasing the second path migration configurations by the child node when the first candidate cell and the second candidate cell are different or the DU to which the first candidate cell belongs and the DU to which the second candidate cell belongs are different.

10. The method according to supplement 1, wherein the method further includes:

receiving a reestablishment success indication by the child node; and falling back to the original path configuration and releasing the second path migration configurations by the child node;

wherein the reestablishment success indication is transmitted by the IAB-node when the IAB-node selects a DU to which the first candidate cell does not belong to perform RRC reestablishment and the RRC reestablishment is successful.

11. The method according to supplement 10, wherein, the reestablishment success indication includes an ID of a cell where the IAB-node performs RRC reestablishment or an ID of a DU to which a cell where the IAB-node performs RRC reestablishment belongs.

12. The method according to supplement 11, wherein, when the cell where the IAB-node performs RRC reestablishment is identical to the second candidate cell or a DU to which the cell where the IAB-node performs RRC reestablishment belongs is identical to the DU to which the second candidate cell belongs, the child node executes the second path migration configurations corresponding to the second candidate cell or the DU to which the second candidate cell belongs.

13. The method according to supplement 11, wherein the method further includes:

falling back to the original path configuration and releasing the second path migration configurations by the child node when the cell where the IAB-node performs RRC reestablishment is different from the second candidate cell or a DU to which the cell where the IAB-node performs RRC reestablishment belongs is different from the DU to which the second candidate cell belongs.

The invention claimed is:

1. An apparatus for transmitting and receiving signals arranged in a first donor-CU, the apparatus being applicable to a process of migrating an IAB-node under control of the first donor central unit (donor-CU) from a first donor distribution unit (DU) to a second donor DU, wherein the apparatus comprising:

a memory; and processor circuitry coupled to the memory and configured to:

transmit one or more first path migration configurations for an integrated access and backhaul node (IAB-node); and transmit one or more second path migration configurations for a child node, wherein the first path migration configurations correspond to a parent node to which a first candidate cell of the IAB-node belongs, and the second path migration configurations correspond to a parent node to which a second candidate cell of the IAB-node belongs, wherein in a case where the second donor DU belongs to a second donor-CU, the processor circuitry is further configured to:

transmit one or more first path migration requests for the IAB-node to the second donor-CU;

receive one or more first path migration configurations for the IAB-node from the second donor-CU;

transmit one or more second path migration requests for the child node of the IAB-node to the second donor-CU; and receive one or more second path migration configurations for the child node from the second donor-CU, and wherein the first path migration requests correspond to the parent node to which the first candidate cell belongs, and the second path migration requests correspond to the parent node to which the second candidate cell belongs.

2. The apparatus according to claim 1, wherein, the first path migration configurations and the second path migration configurations at least comprise at least one of the following parameters:

an IP address anchored at the second donor DU, a routing ID, a radio link control (RLC) channel ID, and a new backhaul adaptation protocol (BAP) address.

3. The apparatus according to claim 1, wherein the processor circuitry is further configured to set an execution condition to which the second path migration configurations correspond and transmits the execution condition to the child node, so that the child node executes the second path migration configurations when the child node satisfies the execution condition.

4. The apparatus according to claim 1, wherein the processor circuitry is further configured to:

send the second path migration request for the child node via a Handover Request Message, via a SN Addition Request Message, or via a Transport Migration Request Message, and receive the second path migration configuration for the child node via a Handover Response Message, or via a SN Addition Response Message, or via a Transport Migration Response Message.

5. An apparatus for transmitting and receiving signals, the apparatus being applicable to a process of migrating an integrated access and backhaul node (IAB-node) from a first donor distribution unit (DU) of a first donor central unit (donor-CU) to a second donor DU, and being arranged in the IAB-node, wherein the apparatus comprising: a memory; and processor circuitry coupled to the memory and configured to: receive one or more first path migration configurations for the IAB-node transmitted by the first donor-CU, the first path migration configurations correspond to a parent node to which a first candidate cell of the IAB-node belongs; when an execution condition of the first path migration configurations is satisfied, the IAB-node executes the first path migration configurations and initiates random access to the first candidate cell to which the first path migration configurations correspond; and when the random access is successful, the IAB-node transmits a first migration success indication to a child node.

6. The apparatus according to claim 5, wherein, the first migration success indication comprises a cell ID of the first candidate cell or an ID of the DU to which the first candidate cell belongs.

7. The apparatus according to claim 5, wherein when the random access fails, the processor circuitry is further configured to transmit a migration failure indication to the child node, so that the child node falls back to an original path configuration and releases the second path migration configurations.

8. The apparatus according to claim 5, wherein when the random access fails, the processor circuitry is further configured to trigger an RRC reestablishment process; and when the IAB-node selects the DU to which the first candidate cell belongs and the random access is successful, or when RRC reestablishment of the IAB-node to the DU to which the first candidate cell belongs is successful, a second migration success indication is transmitted to the child node.

9. The apparatus according to claim 8, wherein, the second migration success indication comprises a cell ID of the first candidate cell or an ID of the DU to which the first candidate cell belongs.

10. The apparatus according to claim 5, wherein when random access fails, the processor circuitry is further configured to trigger the RRC reestablishment process; and when the IAB-node selects a DU to which the first candidate cell does not belong and the RRC reestablishment is successful, an RRC reestablishment success indication is transmitted to the child node.

11. The apparatus according to claim 10, wherein, the RRC reestablishment success indication comprises an ID of a cell where the IAB-node performs RRC reestablishment or an ID of a DU to which a cell where the IAB-node performs RRC reestablishment belongs.

12. An apparatus for transmitting and receiving signals, the apparatus being applicable to a process of migrating an integrated access and backhaul node (IAB-node) under control of a first donor central unit (donor-CU) from a first donor distribution unit (DU) to a second donor DU, and being arranged in a child node of the IAB-node, the apparatus comprising: a memory; and processor circuitry coupled to the memory and configured to: receive one or more second path migration configurations for the child node transmitted by the first donor central unit (donor-CU), the second path migration configurations correspond to a parent node to which a second candidate cell of the IAB-node belongs, receive a first migration success indication transmitted by the IAB-node when random access initiated by the IAB-node to the first candidate cell is successful; and execute second path migration configurations to which the parent node to which the second candidate cell belongs corresponds.

13. The apparatus according to claim 12, wherein, the first migration success indication comprises a cell ID of the first candidate cell or an ID of a DU to which the first candidate cell belongs.

14. The apparatus according to claim 13, wherein, when the first candidate cell is identical to the second candidate cell or the DU to which the first candidate cell belongs is identical to a DU to which the second candidate cell belongs, the child node executes the second path migration configurations corresponding to the second candidate cell or the DU to which the second candidate cell belongs.

15. The apparatus according to claim 12, wherein the processor circuitry is further configured:

receive a migration failure indication transmitted by the IAB-node when random access initiated by the IAB-node to the first candidate cell fails; and fall back to an original path configuration and releases the second path migration configurations.

16. The apparatus according to claim 12, wherein the processor circuitry is further configured to:

receive a second migration success indication; and execute the second path migration configurations to which the second candidate cell corresponds and releases the original path configuration;

wherein the second migration success indication is transmitted by the IAB-node when the IAB-node selects a DU to which the first candidate cell belongs to perform RRC reestablishment and the random access is successful or when the RRC reestablishment of the IAB-node to the DU to which the first candidate cell belongs is successful.

17. The apparatus according to claim 16, wherein, the second migration success indication comprises a cell ID of the first candidate cell or an ID of the DU to which the first candidate cell belongs.

18. The apparatus according to claim 12, wherein the processor circuitry is further configured to:

receive an RRC reestablishment success indication; and fall back to the original path configuration and releases the second path migration configurations;

wherein the reestablishment success indication is transmitted by the IAB-node when the IAB-node selects a DU to which the first candidate cell does not belong to perform RRC reestablishment and the RRC reestablishment is successful.

19. The apparatus according to claim 18, wherein, the RRC reestablishment success indication comprises an ID of a cell where the IAB-node performs RRC reestablishment or an ID of a DU to which a cell where the IAB-node performs RRC reestablishment belongs.

* * * * *